US005128881A

United States Patent [19]

Saum et al.

[11] Patent Number: 5,128,881

[45] Date of Patent: Jul. 7, 1992

[54] MEANS AND METHODS FOR PREDICTING HOLD TIME IN ENCLOSURES EQUIPPED WITH A TOTAL FLOODING FIRE EXTINGUISHING SYSTEM

[75] Inventors: David W. Saum, Falls Church; Arthur M. Saum, Waynesboro, both of Va.

[73] Assignee: Saum Enterprises, Inc., Falls Church, Va.

[21] Appl. No.: 245,666

[22] Filed: Sep. 9, 1988

[51] Int. Cl.[5] ........................ G06F 15/20; G01M 3/04

[52] U.S. Cl. ........................................ 364/550; 73/40; 364/509; 364/512; 364/551.01; 364/579

[58] Field of Search ........................ 169/46, 47, 54, 56, 169/60, 61; 73/40, 40.7, 708, 865.6; 364/509, 510, 512, 550, 551.01, 578, 579

[56] References Cited

U.S. PATENT DOCUMENTS

| | | | |
|---|---|---|---|
| 4,363,236 | 12/1982 | Meyers | 73/40 |
| 4,449,393 | 5/1984 | Tucker et al. | 73/40 |
| 4,493,207 | 1/1985 | Dempsey | 73/40.7 |
| 4,510,791 | 4/1985 | Yuill | 73/40 |
| 4,517,826 | 5/1985 | Cole et al. | 73/40 |
| 4,646,564 | 3/1987 | Ide et al. | 73/865.6 |
| 4,823,290 | 4/1989 | Fasack et al. | 364/550 |
| 4,852,054 | 7/1989 | Mastandrea | 364/509 |

OTHER PUBLICATIONS

Standard on Halon 1301 Fire Extinguishing Systems, NFPA, 1985.

"A Review of Discharge Testing of Halon 1301 Total Flooding Systems", DiNenno et al., Hughes Associates, Inc., May 1, 1988.

"Pressurization Air Leakage Testing for Halon 1301 Enclosures", David Saum et al., The Conservation Foundation, Jan. 13, 1988.

*Primary Examiner*—Kevin J. Teska

*Attorney, Agent, or Firm*—Armstrong, Nikaido, Marmelstein, Kubovcik & Murray

[57] ABSTRACT

Test apparatus and method for determining whether an enclosure containing articles of value susceptible to damage by fire and also by water is able to pass a hold time requirement in the performance specifications of a fire extinguishing system installed in the enclosure. The fire extinguishing system acts by injecting and distributing a volatile extinguishing agent in an initially generally uniform manner throughout the enclosure, and requires for effective action that a specified minimum concentration of the agent be maintained in specified regions of the enclosure for a specified minimum hold time.

37 Claims, 13 Drawing Sheets

MEANS AND METHODS FOR PREDICTING HOLD TIME IN ENCLOSURES EQUIPPED WITH A TOTAL FLOODING FIRE EXTINGUISHING SYSTEM

In fixed enclosures containing equipment or material susceptible to fire damage and also susceptible to damage by water and other common fire fighting media, the fire extinguishing system of choice is one in which a volatile halogenated hydrocarbon is injected into the enclosure, where it vaporizes and mixes with the air present in a concentration sufficient to extinguish the fire. Such total flooding systems (as distinguished from local application systems) are applicable for enclosures such as vaults, enclosed machines, ovens and bins, but for purposes of simplification the application described here is restricted to relatively large rooms containing computers and related electrical equipment, commonly referred to as computer rooms. In most such systems the extinguishing agent used is bromotrifluoromethane, manufactured by E. I. duPont de Nemours, Inc., Wilmington, Del. under the trade name Halon 1301, and often referred to in the following discussion simply as Halon.

A Standard, No. NFPA 12A, "Halon 1301 Fire Extinguishing Systems," 1985 Edition, has been issued by the National Board of Fire Underwriters. Some of the information in this discussion is taken from that standard. The standard provides specific information on equipment for storing the Halon prior to use, and for injecting the required amount into the enclosure through nozzles at one or more locations within a specified maximum time period, usually ten seconds. This injection system is designed to generate a high level of turbulence which disperses the Halon uniformly throughout the enclosure.

Although a number of halogenated fluorocarbons have fire-extinguishing properties, Halon 1301 is the most frequently used agent in computer room installations. Under normal conditions it is a colorless, odorless gas which can easily be liquified under compression for convenient shipping and storage. It has low toxicity, so that it is not harmful to personnel that might be exposed to it during a fire-extinguishing release for moderate periods at concentrations effective in extinguishing fires. Typically, fires are extinguished if exposed to atmospheres containing at least 5% Halon by volume for at least 10 minutes.

Before a Halon fire extinguishing system is put into service it must be approved as having been properly installed and able to function as specified. Mechanical elements of the system must meet specifications given in the Standard. Other major factors include:

1. Discharge time (typically 10 seconds maximum)
2. Concentration achieved
3. Agent distribution (mixing)
4. Hold time (typically a concentration above 5% for at least ten minutes).

The first three factors can generally be controlled by proper engineering design and application of known principles as described in Standard NFP-12A. Factor 4, hold time, is more difficult to predict. This is because Halon itself is 5.2 times denser than air, and thus the air/Halon mixture has a specific gravity higher than that of the air surrounding the room. This heavier mixture tends to leak out of openings in the enclosure by gravity flow, with an equal volume of air flowing in simultaneously. Even if the Halon is dispersed initially so that it is distributed uniformly and in the desired concentration in the room, it can leak out so rapidly that the required minimum concentration is not maintained for the required minimum time. The leakage rate depends on some factors which are readily calculated: the specific gravity difference, which is a function of the Halon concentration and the ambient air temperatures (inside and outside the room) and the barometric pressure, and the height of the room. However the leakage rate also depends to a large degree on the size, location and general physical form of the leakage sites, which vary from room to room in a manner which it is much more difficult to specify. Large obvious leaks are generally easy to find and eliminate—providing there is some way of knowning that leaks are a problem in the first place. A multiplicity of small leaks may be equally detrimental, but more difficult to diagnose. The location of leaks is also important—as illustrated by an example in which all of the leaks are located in the ceiling and none in the walls or floor, resulting in virtually no leakage! Lastly, the physical form of the leaks is significant, as for example thin cracks in thick walls leak differently than wider holes in thin walls.

At present the only dependable way to determine whether a Halon fire-extinguishing installation will meet hold time specifications is to carry out an actual release test with Halon 1301. This is undesirable for two reasons. First, it is expensive. For example, to test a not unusually large computer room of a volume of 100,000 cubic feet requires about 2,340 lb. of Halon, at a cost for the material alone of over $11,000. Second, Halon 1301 is one of the class of halogenated fluorocarbons whose release into the atmosphere is believed to contribute to the depletion of atmospheric ozone, and quantities released are subject to increasing governmental restrictions. It would be very desirable to have a test method which would predict hold time in Halon fire-extinguishing systems, economically and without the release of halogenated fluorocarbons, and at an acceptable level of confidence, a broad purpose of this invention.

Regarding prior art, substitute test agents have sometimes been used Halon 122 (dichlorodifluoromethane) is the one that has been most generally used for this purpose. See for example, "Review of Halon Discharge Testing," Section 5,4,4 for substitute test agents. Halon 122 is also a halogenated fluorocarbon, so it is not really a solution to the above problem. Blower Doors, or Door Fans, which are commercially available test devices used to measure air leakage primarily in residential buildings for purposes of reducing heating and air-conditioning costs, have also been used to some extent to test computer rooms. Such usage has been restricted to measurements of leakage area by the same techniques used for residential structures or has been qualitative in nature, aimed at estimating overall leakage level and correcting leaks. No techniques are known to accurately measure leakage in large rooms, even millions of cubic feet in volume, to estimate the effect of leak distribution, and to apply this information to predict hold time performance of a Halon fire extinguishing system.

To adequately test leakage characteristics of a moderately large computer room so as to predict its hold time performance, equipment requirements are illustrated by an example of a room 10,000 sq. ft. in floor area with a 12 ft. high ceiling thus having a volume of 120,000 cu. ft. A blower door test system consists of a variable speed fan (the blower) together with a panel arrangement (the door) that permits mounting of the fan in a generally airtight manner in an outside door of the building to be tested. Instrumentation includes means to measure: (1) the rate of flow of air through the fan either as a function of fan RPM (RPM type) or of pressure drop associated with an orifice or nozzle (orifice/-nozzle type), and (2) the pressure developed inside the building under various rates of air flow. One common type of blower door test involves pressurizing (or depressurizing) the room at from 0.05 to 0.3 in. WC (inches of water column) pressure, at intervals of 0.05 in. WC (equivalent to 12.5 to 75.0 Pascals at intervals of 12.5 Pa), measuring leakage at each of these levels, and fitting the data to the following Flow Equation, thereby permitting calculation of the constants C and N:

$$Q=CP^N$$

where

Q is the flow in cu. ft./min., (CFM)

P is the pressure, in. WC c is a constant, equivalent to flow at 1 in. WC

N is the flow exponent (N would be 0.5 for a wide hole in a thin wall, is about 0.65 for average building cracks, approaches 1.0 for thin cracks in thick walls).

Another common way to characterize building air leakage is by means of its air changes per hour (ACH) at some standard pressure, commonly 0.2 in. WC or 50 PA., where $$ACH=(Q\times 60)/V$$

where

Q is the flow at the standard pressure, CFM

V is the internal volume of the building, cu. ft.

A typical value of ACH for a fairly tight building, at 0.2 in. WC, is 5.0. So for the computer room under discussion, $$5.0=(Q\times 60)/120{,}000$$

solving for Q, $$Q=10{,}000 \text{ CFM}$$

Commercially available blower doors have maximum flow capacities in the 4–5,000 CFM range, so they would be incapable of pressurizing this room to 0.2 in. WC. An estimate of the pressure actually attainable can be made from the flow equation given earlier, assuming a value 0.5 for N. Putting Q=10,000 in the equation, and P=0.2 in WC:

$$10{,}000 = C\times 0.2^{0.5}$$
$$C = 22{,}361$$

So the flow equation for this room is $$Q=22{,}361\ P^{0.5}$$

Inserting for Q the value 5000 CFM as a maximum blower door flow rate, and solving for P $$5{,}000 = 22{,}361\ P^{0.5}$$
$$P = (5{,}000/22{,}361)^2 = 0.050 \text{ in. WC}$$

So about 0.050 in. WC is the maximum pressure that a standard blower door will be able to generate in this room. If readings are desired at, say, five levels, these could be at 0.01 to 0.05, at 0.01 in. intervals. To be meaningful, these pressure measurements require an accuracy, at the very least, of about ±5% at the highest test pressure, which translates to ±0.0025 in. WC. Pressure gauges installed on most commercially available blower doors are of the Dwyer Magnehlic type. These gauges are rated by the manufacturer to be accurate within ±4% of full scale for the 0–0.25 in. gage (equivalent to ±0.010 in. WC), and ±3% for the 0–0.5 in. gage (equivalent to ±0.015 in. WC). So neither of these gauges should be used for the example cited. On the other hand, an electronic gauge such as the Neotronics EDM (electronic digital micromanometer) reads pressure in 0.001 in. WC increments and is rated by the manufacturer as accurate within ±1% one digit, or ±0.0015 at the 0.05 level, and would be fully satisfactory for the example cited. For smaller rooms capable of being pressurized by available equipment to, say, 0.3 in. WC, the Magnehlic gauges would be satisfactory.

In more general terms, the accuracy requirement of the pressure-measuring instrument can be restated that: The maximum pressure attainable in the enclosure must be at least about twenty times the accuracy limit of the pressure measuring instrument. For the pressure instruments cited above, the maximum attainable pressure must be at least about 0.20 in. WC for a 0–0.25 in. Magnehlic gauge, but may be as little as about 0.03 in. WC for a Neotronics EDM gauge. More generally, increased sensitivity of the pressure measuring instrument permits larger rooms to be tested.

By employing higher capacity air transfer equipment, still larger rooms can be tested. One way to accomplish this is to use multiple blower doors. Of course, this adds to the equipment cost, and suitable openings must be available in the walls of the enclosure to mount them. For practical purposes it has been found that about four blower doors is about the limit, but more could be used. The advantage of using blower doors is that they are hand portable and easy to install. Other higher capacity air transfer means could be used if it met the requirements of flow reversibility and flow metering capability.

Maximum attainable pressure increases dramatically when multiple blower doors (or other source of greater air transfer rate) are employed. This is illustrated in the following tabulation.

| | Room Volume, cu. ft. | | | | |
|---|---|---|---|---|---|
| | 50,000 | 120,000 | 500,000 | 1,000,000 | 1,000,000 |
| | Air Changes per Hour:** | | | | |
| | 5.0 | 5.0 | 5.0 | 5.0 | 3.0 |
| No. Blower Doors | Max. Pressure @ 5,000 CFM/Blower Door in.WC | | | | |
| 1 | 1.0+ | 0.050* | 0.003 | 0.001 | 0.002 |
| 2 | 1 0+ | 0.200 | 0.012 | 0.003 | 0.008 |
| 4 | 1.0+ | 0.800 | 0.045 | 0.012 | 0.033 |

*Example in text
**At 0.2 in.WC

According to these calculated values, a Magnehlic pressure gauge could be used for purposes of this invention with one blower door for rooms up to about 50,000 cu. ft. volume, and with two or three blower doors for rooms up to 120,000 cu. ft. It could not be used, even with four blower doors, for a room 500,000 cu. ft. in volume or greater. The last two columns illustrate that as leakage is reduced (i.e., by plugging leaks) the capacity (and also the measuring accuracy) of the test equipment becomes greater. In practice, it is generally easier to attain a lower level of leakage, as measure by ACH, the larger the room volume. This is because leaks are more likely to be associated with the surface area of the walls, ceiling and floor of the room, and the ratio of surface area to volume generally decreases as room volume increases.

A further consideration in connection with the measurement of flow rates over a series of pressures arises from the facts that the purpose of these measurements is to arrive at the most accurate practically attainable estimate of flow rate at a certain pressure. Sources of error in the estimate are not only those in the pressure and flow measurements themselves, but also those involved in translating these results to the desired pressure. It is preferable that the range of measured pressures include the desired pressure, so that the calculated flow rate is arrived at by interpolation, rather than by extrapolation. If this is not practical, it is desirable that the extent of extrapolation be limited to the minimum practical amount.

The purpose of the test procedure described above is to obtain inforamtion needed to estimate the rate of leakage of air/Halon mixture by gravity-induced flow during operation of a Halon fire-extinguishing system. This requires knowledge of the gravitational force causing the leakage, which is illustrated by the following calculation. Assume a computer room having a ceiling 12 ft. high has dispersed in it 6% Halon by volume. At standard conditions (70° F., 29.92 in. Hg barometric pressure, commonly designated NTP), the gravitational head in the room relative to the air outside the room needs to be determined. The density of air at NTP is 0.075 lb. per cu. ft., and pure Halon vapor is 5.2 times as dense at 0.390 lb. per cu. ft. The density of air plus 6% Halon is the sum:

$$\begin{aligned} 0.06 \times 0.390 &= 0.0234 \\ 0.94 \times 0.075 &= \underline{0.0705} \\ \text{Density air} + 6\%\ \text{Halon} &= 0.0939\ \text{lb./cu.ft.} \end{aligned}$$

The gravity pressure head of a 12 ft. high column of the mixture relative to surrounding air is:

$$\begin{aligned} \text{Gravity pressure head} &= (0.0939 - 0.075) \times 12\ \text{ft., in lb./sq. ft.} \\ &= 0.0189 \times 12 \times 12/62.4\ \text{in. WC} \end{aligned}$$

(where 62.4 is the density of water in lb./cu. ft.)

$$= 0.0436\ \text{in. WC}$$

More generally, if h is the ceiling height in ft., for 6% Halon and NTP, $$\text{Gravity pressure head} = 0.00363 \times$$

For a ceiling height of 8 ft., the corresponding gravity pressure head is 0.029 in. WC. Taking 0.03 as a nominal value of the pressure head, consider a room in which half of the leaks are very near the ceiling , and the other half near the floor. Under these conditions, one-half the pressure head, or 0.015 in. WC, is acting to drive the air/Halon mixture out of the room through the leaks near the floor, and the other half is acting to drive air into the room through leaks in the ceiling. Since the leakage behavior of openings varies with pressure it is apparent that knowledge of leak rates at the very low pressures in the range of about 0.015 in. WC is necessary to predict the hold time behaviour of such a room during a Halon fire extinguishing test.

In the case of very large rooms, multiple blower doors must be used even to reach a maximum of 0.05 in. WC pressure. In an actual test of a room of about two million cubic feet volume, four standard blower doors were required. One blower door was completely inadequate, even using highly sensitive pressure measuring equipment.

One final point is that it becomes increasingly more difficult to find and further reduce the rate of leakage to a point where the rate of loss of Halon is negligible so that a Halon fire prevention system is automatically assured of passing the hold time requirements. Furthermore, when the Halon is initially injected into the room, this is done very rapidly (within 10 seconds) to generate turbulence to distribute the Halon uniformly throughout the room. A certain amount of pressure may be generated in the room as a result of this release of Halon, and if the room is sealed too tightly there is a possibility of enough pressure being generated to damage the walls of the room.

The above discussion demonstrates that detailed and accurate knowledge of the quantity and distribution of leakage sites in a computer room, and how they respond in terms of the gravitational leakage of an air/Halon mixture, and also their effect on pressure generated when Halon is injected into the room, provide a possible basis for predicting the performance of a Halon fire prevention system without the actual release of Halon. The object of this invention is to provide means to achieve this end.

SUMMARY OF THE INVENTION

It is therefore among the objects of the invention to provide methods for the determination of a predicted hold time for retention of Halon above a specified concentration, in a specified region of an enclosure such as a computer room, ranging in size from hundreds to millions of cubic feet, which represents the "worst case" combination of forseeable conditions, so that if this predicted times is greater than the minimum hold time in the test performance specifications, this will provide assurance that the system would pass an actual performance test. If the worst case predicted hold time first determined does not pass the test specification, the invention provides a procedure to monitor the work of plugging leaks until the predicted hold time does exceed the performance test specification. This is generally beneficial because it avoids the cost of unnecessary labor of making the enclosure too tight. Furthermore, too tight an enclosure may result in damage to the building structure from pressure surges when the Halon injection system is operated. In addition to plugging leaks, the steps taken to improve the accuracy (i.e., reduce the error) of test data and also calculation procedures used to calculate predicted hold time. This is beneficial because it reduces the amount of work spent unnecessarily in plugging leaks. The invention also provides an estimate of an equivalent leakage area, A, which is a measure of the total effect of all of the individual leakage sites.

Instrument means used in the invention include a pressure measuring device capable of expeditiously and conveniently measuring under field conditions the pressure differences between the inside and outside of the enclosure with accuracy limits of at least about ±0.015 in. WC, and preferably within about "0.002 in. WC. Further included is air transfer equipment, such as one or more blower doors, which can be mounted temporarily in generally airtight fashion on one or more openings in the enclosure, to transfer air into or out of the enclosure at an adjustable and accurately measured rate and sufficient to generate in the enclosure a pressure of at least about twenty times the limit of error of the pressure measuring device.

In one version of the invention, a series of flow versus pressures measurements are made over a range of pressures. Flow equations are derived providing the best fit of flow rate to pressure for positive and negative pressurization. A convenient form of flow equation is:

$$\text{Flow} = C \times p^{N}$$

where

Flow is in cu. ft. per min.

C is generally constant, but varies with gas density p is pressure difference, inside to outside N is a constant, ranging in value between 0.5 and 1.0.

Significant differences in the flow equations for pressurization and depressurization denote extraneous sources of air movement, such as imbalance in heating, ventilating and air-conditioning equipment. Such differences need to be resolved not only for purposes of this test, but for efficient operation of the Halon fire extinguishing system itself. After minimizing differences, results are averaged to give a single flow equation representative of pressurization and depressurization. In an alternative version of this invention, the flow equation is derived from the rate of decay of a pressure pulse generated by rapidly introducing a quantity of gas into the enclosure.

The total gravity pressure head, H, resulting from the heavier-than-air/Halon mixture contained in the enclosure is also estimated for anticipated test conditions. In simplified form:

$$H = (d_2 - d_1) \times h \times 0.192$$

where H is the gravity pressure head, is WC $d_1$ is the density of air outside the enclosure, lb./cu. ft.

$d_2$ is the density of air/Halon inside the enclosure, lb./cu. ft.

h is the inside height of the enclosure, ft.

This pressure head may range from as little as about 0.03 in. WC for 6% Halon in a room with an 8-ft. high ceiling, to about 0.6 in. WC, for 8% Halon in a very large room with a 130-ft. ceiling-to-floor distance.

The flow equation is used to estimate a worst case of leakage rate of air/Halon mixture from the enclosure at pressures approximateing those exerted at leakage sites by the gravity pressure head of this mixture within the enclosure. An exact calculation is impossible because a) the flow equation is determined for conditions in which all of the air is either being blown inward through all of the leakage sites, or outward through all of them, and all at the smae driving pressure, b) for gravity driven leakage, air if flowing inward through a portion of the sites in the upper part of the room, and air/Halon mixture is flowing outward through sites in the lower portion of the room, and c) for gravity driven leakage, the driving pressure is not even the same at all sites, being greatest at the ceiling and floor and diminishing to zero at some intermediate level, known as the neutral plane. These difficulties are resolved in a novel manner in this invention by using the derived flow equation and the calculated gravity head to calculate an extreme worst case leakage rate based on the following assumptions:

| | |
|---|---|
| 0 | Leakage is as if all leakage sites were either in the floor or in ceiling |
| 0 | Distribution of leakage in floor and ceiling is 50:50 |
| 0 | Air/Halon mixture leaks at the same rate as air (Actual leakage varies inversely with density, hence is less,) |
| 0 | Test errors in measuring C and N are zero. |

Under these conditions, the pressure exerted across leaks at the top and at the bottom is the same, and is one-half the total gravity head, or H/2. Also, since inward and outward flows must be equal, each is equal to one-half the flow calculated from the flow equation at a pressure of H/2. So from the flow equation:

$$\text{Extreme Worst Case Leakage} = 0.5\ C\ (H/2)^{N}$$

This is a very simple and useful relationship.

A more general form of the above equation is preferably used in this invention, as follows:

$$\text{Effective Worst Case Leakage} = 0.5\ C\ (H/2)^{N} \times k_1 \times k_2 \times k_3 \times k_4 \times$$

where the k's are factors to take into account known effects not including in the above assumptions, such as the following:

$k_1$ is an error factor, reflecting the test procedure errors is generally greater than 1.0

$k_2$ is diffusion/convection factor is generally greater than 1.0

$k_3$ is an air/Halon density factor depends on % Halon and temperature inside enclosure is generally less than 1.0.

$k_4$ is a neutral plane factor is generally less than 1.0

Estimation of these factors is described later.

In the usual Halon system, entering air forms an increasingly deep layer on top of the air/Halon mixture as leakage progressesm, and the test specifications define a Maximum Unprotected Volume, usually 10% of the total volume, below which the Halon concentration must be maintained above a specified minimum value for a specified minimum time. Under the invention, the estimated worst case hold time for this case is:

$$\text{Estimated Worst Case Hold Time} = \frac{\text{Maximum Unprotected Volume}}{\text{Effective Worst Case Leakage}}$$

For the case in which air circulation is provided to maintain a generally uniform concentration of Halon throughout the enclosure, the estimated worst case hold time is proposed as the time require for the Halon concentration to decrease from an initial value $C_o$ to the specified minimum value $C_{min}$, and is given by:

Estimated Worst Case Hold Time =

-continued $$\frac{(-\ln(C_{min}/C_o) \times \text{(Room Volume)})}{\text{Effective Worst Case Leakage}}$$

Generally the estimated worst case hold time is significantly greater for a given enclosure with uniform Halon distribution than with a stratified distribution, and this constitutes a novel and valuable aspect of this invention. A further advantage is that fire extinguishing action is maintained throughout the room.

In another modification fo the invention, the leakage flow equation is derived from the rate of decay of a pressure pulse generated by rapid introducation of a quantity of a gas into the enclosure. It is particularly advantageous to utilize the installed hardware of the Halon injection system to introduce the gas, particularly nitrogen gas.

The invention further provides a procedure to locate the neutral pressure plane in an enclosure during gravity-induced flow, and to apply this information to calculate the factor $k_4$ cited earlier.

Further provided by the invention is a procedure to estimate pressure surge effects, using a model developed from field observations and test chamber experiments. It utilizes a novel inverse relationship demonstrated between the cooling effect due to Halon vaporization and the volume change due to the resulting vapor, when Halon liquid is injected into a room to produce a vapor concentration of about 6% by volume. Under adiabatic conditions the net volume would be negative, resulting in a negative pressure. Positive pressure develops from warming of the gas mixture by heat transfer from interior surfaces of the room. Demonstration of this effect is provided in FIG. 4 showing a correlation between a change in inside wall temperature and amount, i.e., concentration, of Halon injected in test chamber experiments. Observed pressure variations reflect the balance between the rate of Halon injection, rate of heat transfer during the highly turbulent injection period, and to a lesser extent the leakage characteristics of the room.

An extremely sensitive electronic digital micromanometer is disclosed, having a digital readout of ±0.0001 in. WC pressure. Its utility is demonstrated in estimating the location of the neutral plane in a room under test, by artificially inducing a gravity pressure head, as by a temperature difference inside and outside the room. A recording version of the device was used to accurately monitor the decay of pressure pulses having initial pressures of a few tenths of an in. WC, and a duration of about a second.

Figure 1:
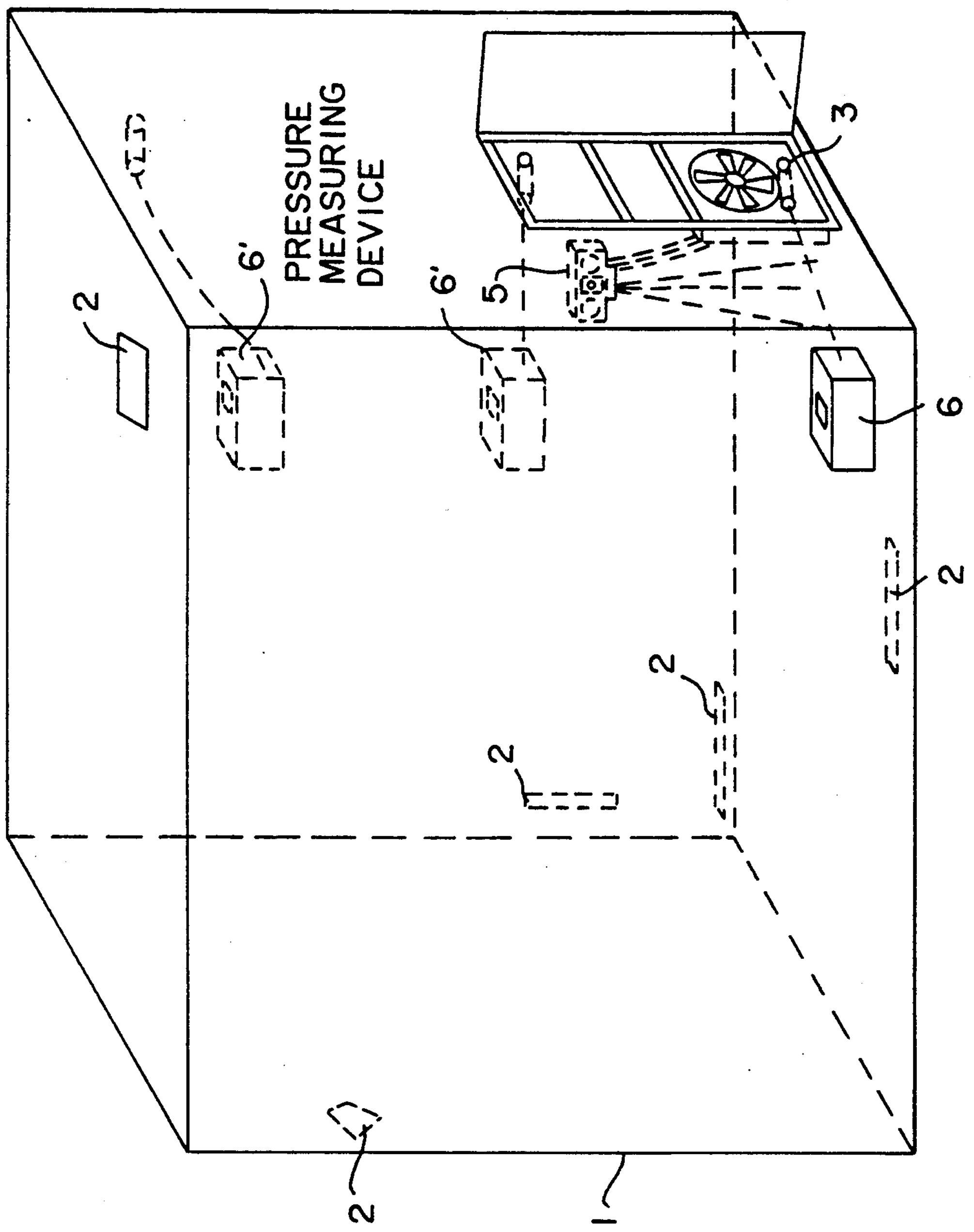
FIG. 1 shows an arrangement of equipment for leakage measurement in a room such as a computer room.

DETAILED DESCRIPTION OF THE PREFERRED EMBODIMENTS:

Referring to FIG. 1, this illustrates an arrangement of equipment to measure flow through leaks 2 in enclosure 1 for purposes of this invention. The air transfer device 3 is shown as a blower door sealably mounted in a door opening 4 in room 1 and an instrument module 5 containing a control for fan speed, gauges for measuring pressure difference and air flow rate and a computer for anaylzing the various parameters in accordance with the present invention. In the development of this invention the device actually used as an INFILTEC Model R-1 blower door, which has a maximum capacity in the range of 4–5,000 CFM, depending on the static pressure head. A high sensitivity pressure measuring device 6 is shown in one typical position at floor level, with one port, connected by a host to a tube passing through the bottom of the door panel, to the outside of the room. Other locations for the pressure measuring device are shown be devices 6'. The pressure measuring device was an Electronic Digital Micromanometer (EDM) made by Neotronics Corporation, reading directly to 0.001 in. WC pressure, and having a rated accuracy of within ±1%+1 digit.

The first step in the application of the invention to a computer room usually is to determine the anticipated gravity head, H, of the air/Halon mixture expected to be injected into the room, given the height of the room, ambient air conditions, and the anticipated Halon level (typically 6% volume). This is given by the equation:

$$H+h_t((100-\%\text{Hal})+(\%\text{Hal}\times 5.2))\times(T_{out}-T_{in})-100)\times d_{air}\times 0.001923$$

where

H is the gravitational head in in. WC $h_t$ is the total inside ceiling height, ft.

$d_{air}$ is the density of air at ambient conditions outside the enclosure, lb./cu. ft., 0.075 at NTP 5.2 is the ratio of the density of Halon gas to air 0.001923 is a unit conversion factor $T_{OUT}$ and $T_{in}$ are the temperatures in absolute units For 6% Halon at NTP inside and out:

$$H=0.00363\times h_t$$

For example, in a room with a 10 ft. ceiling, H would be 0.036 in. WC. But for 8% Halon in a very large room with a 130 ft. height it would be very much greater, 0.63 in. WC.

H calculated as above is the initial value. More precisely, H decreases with time as air/Halon leaks from the enclosure. The effect is small, generally in the neighborhood of 5%, and negative, hence on the conservative side for calculating worst case leakage rates, so it may be generally ignored for purposes of this invention. Because of evaporative cooling, the temperature inside a room has generally been observed to drop about 10° to 25° F. during Halon discharge. The effect is to increase H, and hence increase leakage rate. For purposes of this inveniton this effect can be allowed for adequately by assuming a temperature drop of 15° F. In terms of the examples cited previously the effect of this assumption is as follows, assuming NTP conditions outside the enclosure:

| Enclosure | | $T_{out} - T_{in}$ | H | Difference |
|---|---|---|---|---|
| Ceiling $h_t$ | % Hal | °F. | in. WC. | % |
| 10 | 6 | 0 | 0.0363 | |
| 10 | 6 | 15 | 0.0416 | 14.4 |
| 130 | 8 | 0 | 0.630 | |
| 130 | 8 | 15 | 0.703 | 11.6 |

In the procedure in which the air/Halon mixture inside the room is kept uniformly mixed, the same general principles as described above apply in the calculation of the pressure head.

The next step is the formulation of a flow equation expressing the leakage characteristics of the room as a function of pressure. In the procedure in which air is transferred into or out of the room at measured rates over a range of pressures, this range is preferably selected so that the pressure H/2 is included in the range, and flow rate at this pressure can be determined by interpolation for greater accuracy in the calculation. If this is impractical, for example because of equipment limitations, the range of measurements may be above or below H/2 which is then determined by extrapolation, with loss of accuracy. Having made the series of measurements, the best fitting flow equation of the form $$\text{Flow rate} = Cp^N$$

is determined from the data using a known least squares mathematical procedure. The extreme worst case leakage rate of the room is then determined from the relation:

$$\text{Extreme worst case leakage} = 0.5\ C\ (H/2)^N$$

This extreme worst case leakage rate requires adjustment for test method errors and other factors, as discussed below, to give an "effective" worst case rate.

In the pressure surge procedure, a quantity of gas is rapidly introduced into the room such that there is developed a pressure surge inside the room relative to the outside. A sensitive, accurate, rapidly-responding test instrument is used to simultaneously record time and pressure as the pressure surge is dissipated. Since the peak of the pressure surge is generally only a few tenths of an inch WC and its duration is generally between one and five seconds, the limit of error of the test equipment should be no greater than about 0.005, and preferably no greater than 0.002 in. WC in pressure, and no greater than 0.05 and preferably no greater than about 0.002 seconds in time measurement. Any practical method of generating a pressure pulse may be used, such as by injection of a highly volatile liquid, but a preferred procedure is to release a gas rapidly from a pressurized container into the room. A preferred pressurized container is that installed to contain Halon as part of a fire extinguishing system in the room, and a preferred gas is nitrogen. The procedures for charging such containers with nitrogen and rapidly releasing same is well known, as it is often used to test for leaks in the pipin installation of the sytem. When compressed gas is expanded rapidly into an enclosure as described here, a considerable reduction in temerature occurs. For best results, it is desirable to measure the temperature of the gas and to use this temperature in the ensuing calculations. The record of the decay of the pressure pulse should provide a series of at least about ten pressure readings at equal time intervals over the duration of the pulse. The next step is to formulate a leakage flow equation from these data. This might be done in several ways, but for purposes of this invention the preferred procedure is to develop an equation similar in form to that for the constant-pressure technique, namely:

$$\text{Leakage flow} = C\,p(s)^N$$

where C and N are constants as before, and p(s) is the inside/outside pressure difference, but it is a function of time, s, during, the decay of the pressure pulse. According to this invention, change of p(s) with time is expressed by an equation of the general form:

$$d\,p(s)/ds = -(Cp(s)^N \times A \times P)/(60 \times V)$$

Integrating and rearranging:

$$p(s_2)^{1-N} - p(s \neq )_1)^{1-N} = -(1-N)CPA(s_2 - s_1)/60V$$

where $C = 16.83 \times ((407.1/P)) \times (459.7 + t)/529.7)^{0.5}$
$= 16.83$ at $NTP$
$A$ = equivalent leakage area, sq. in.
$P$ = atmospheric pressure, in. WC; 407.1 at $NTP$
$V$ = volume of enclosure, cu. ft.
$s$ = time in seconds
$p(s)$ = inside/outside pressure difference, in. WC P=atmospheric pressure, in. WC; 407.1 at NTP V=volume of enclosure, cu. ft. s=time in seconds p(s)=inside/outside pressure difference, in. WC N and A are determined by finding values which provide the best fit of test data with the above equation. As an example, a pressure surge was generated in the experimental test chamber by abruptly closing the tight-fitting door. The decay of this surge was monitored at intervals of 0.1 sec. Other test conditions were: P=387.8, t=60° C., V=640. Leakage area A was adjusted to 7.5 sq. in., but this was an "unknown" in the experiment. Rearranging the above equation and inserting known quantities:

$$A = -(p(s_2)^N - p(s_1)^N) \times 5.797/((1-N) \times (s_2 - s_1))$$

Values of A were then calculated for various assumed values of N, with $(s_2 - S_1) = 0.1$ sec. Results were as follows:

| | | Calculated Values of A for Various Values of N | | | |
|---|---|---|---|---|---|
| s | p(s) | N = 0.50 | 0.55 | 0.60 | 0.65 |
| 0.0 | .240 | | | | |
| | | 6.49 | 7.08 | 7.68 | 7.84 |
| 0.1 | .188 | | | | |

-continued

| s | p(s) | N = | 0.50 | 0.55 | 0.60 | 0.65 |
|---|---|---|---|---|---|---|
| | | | Calculated Values of A for Various Values of N | | | |
| | | | 5.68 | 6.18 | 6.67 | 7.06 |
| 0.2 | .148 | | | | | |
| | | | 4.29 | 4.64 | 5.22 | 5.33 |
| 0.3 | .121 | | | | | |
| | | | 5.22/5.42* | 5.80/5.93* | 6.52/6.52* | 6.90/ 6.78* |
| 0.4 | .092 | | | | | |
| | | | 5.80 | 6.70 | 7.54 | 8.16 |
| 0.5 | .064 | | | | | |
| | | | 4.17 | 4.77 | 5.65 | 6.12 |
| 0.6 | .047 | | | | | |
| | | | 4.06 | 4.90 | 5.51 | 6.27 |
| 0.7 | .033 | | | | | |
| | | | 7.42 | 8.89 | 10.90 | 12.39 |
| 0.8 | .014 | | 3.36/4.96* | 4.12/5.88* | 5.22/6.96* | 6.12/ 7.82* |
| 0.9 | .008 | | | | | |
| 1.0 | — | | | | | |
| Sub-average* Spread: | | | 0.44 | 0.05 | 0.44 | 1.04 |
| Overall Average | | | 5.21 | 5.91 | 6.74 | 7.30 |

The value of N=0.55 was judged to provide the best fit, based on having the smallest spread of sub-averages. This yields an overall average A of 5.91 sq. in. It is in surprisingy close agreement with the "known" value of 7.5 sq. in., considering that the whole measurement was completed in less than one second. A special high speed monitoring system, with a sensitive, accurate, and fast-responding pressure transducer built by Infiltec was used in this test. In actual practice, the procedure of finding the best-fitting values of N and A would be well suited to being carried out by a computer program. Also, pulses ranging in magnitude up to several in. WC could be generated, and the decay time would be longer. This experiment however demostrates the practicability of the procedure.

Appropriately corrected, flow equations obtained by either the constant pressure of pulse pressurization methods are equivalent for further calculations. A general limitation of the pulse method is that it involves pressurization only, hence it does not provide information about extraneous sources of air flow into or out of the room.

In regard to the various correction factors in the previously cited equation for Effective Worst Case Leakage:

$$\text{Effective Worst Case Leakage}=0.5\ C\ (H/2)^N \times k_1 \times k_2 \times k_3 X \text{ - - - } K_n$$

The error factor, $k_1$ is given by:

$$k_1=1+((E_1\times\gamma L/\delta X_1)^2+(E_2\times\gamma L/\delta X_2{}^2 + \text{---})^{0.5}$$

where L is the extreme worst case lekage, $x_n$ are parameters determining L and $E_1$, $E_2$, $E_3$, - - - are the error limits, expressed fractionally, of the known test equipment or method errors in the test procedure. For instance, if $E_1$ refers to pressure measurement, and the limit of error is 0.015 at a level of 0.3 in. WC, $E_1=0.015/0.3=0.05$. If the limit or error is known as 4%, this translates to $E_1 4\times 0.01=0.04$.

The diffusion factor $k_2$ is based on observations of the broadening of the air: air/Halon boundary in an experimental test chamber, as described in the Examples. It applies only to stratified air/Halon conditions, and is given by:

ti $k_2=1+12/h_t$ where $h_t$ is the inside height of the enclosure if ft. For non-stratified (fan mixed) air/Halon conidtions:

$$k_2=1.0$$

The air/Halon density factor $k_3$ allows for the effect on leakage rate of the density of the air/Halon mixture, as influenced by % Halon and temperatures inside and outside the room, and is given by:

$$k_3=((100\times T_{in})/((\%\ \text{hal}\times 5.2)-(100-\%\ \text{Hal}))\times T_{out}))^N$$

where $T_{in}$ and $T_{out}$ are in absolute temperature units, such as degrees Rankine. For example, if outside conditions are NTP; the inside temperature is 15° F. cooler than the outside; % Hal=6; and N=0.65:

$$\begin{aligned} k_3 &= ((100\times 514.7)/((6\times 5.2)+(96))\times 529.7))^{0.65} \\ &= 0.839 \end{aligned}$$

The factor $k_4$ makes allowance for the location of the neutral plane, other than at its worse case location, midway between the floor and the ceiling. It is applicable to both stratified and non-stratified air/Halon conditions. Since its value is always unit or less, this factor may be conservtatively omitted without jeopardizing the test validity. Its potential value resides in providing a justifiable approach to reducing the effective worst case leakage rate to an acceptable level when other means have been exhausted or are excessively expensive. If a is the fraction of the total room height at which the neutral plane is located above the floor, the estimated value of $k_4$ is given by the following tabulation:

| a: | 0.0 | 0.1 | 0.2 | 0.3 | 0.4 | 0.5 | 0.6 | 0.7 | 0.8 | 0.9 | 0.0 |
|---|---|---|---|---|---|---|---|---|---|---|---|
| $k_4$: | 0.00 | 0.65 | 0.83 | 0.93 | 0.98 | 1.00 | 0.99 | 0.95 | 0.86 | 0.69 | 0.00 |

This invention provides a procedure for determining a, when required. This is done by artificially including gravity flow conditions in the room. For instance, a temperature difference inside and outside the room may already be present, or may be induced by heating or cooling the room air relative to the outside. If the pressure pulse method is used, this may provide sufficient cooling inside. If such a temperature difference is at least 10° F., and using a sufficiently sensitive pressure difference measuring device, it has been demonstrated that the neutral plane can be located with an adequate degree of precision of purposes of this invention. For instance, a 10° F. temperature difference in a 10 ft. high room generates a total gravity head of 0.0027 in. WC. Instrument means to measure such a pressure within about 0.0003 in. WC provides an accuracy of about ±10%. A digital micromanometer capable of this accuracy has been developed by us. The position of the neutral plane is located as follows. H, the total induced gravity head, is first calculated from measured inside and outside temperatures, air density, and ceiling height, h. For example, for NTP conditions outside the room:

$$h = h_t \times (T_{out} - T_{in}) \times 0.075 \times 12/(529.7 \times 62.4)$$
$$= h_t \times (T_{out} - T_{in}) \times 2.72 \times 10^{-5}$$

H is positive, taken in a downward direction, if the outside temperature is higher than the inside. The inside-to-outside pressure at height h ft. from the floor, p(h) is $$p(h) = p(O) - H \times h/h_t$$

where p(O) is a measured inside-to-outside pressure difference at the floor (where h=0). At the height of the neutral plane from the floor, $h_n$, the inside-to-outside pressure is by definition zero, so $$p(h_n) = 0 = p(O) - H \times h_n/h_t)$$

Rearranging $$h_n = p(O) \times h_t/H$$

By a similar line of reasoning it can be shown that the position of the neutral plane can be deduced from a measurement of the inside-to-outisde pressure at any known height above the room floor. To illustrate the preceding formula, if p(0) is measured as 0.0006 in. WC and H is 0.0027 in. WC, and $h_t$ is 10 ft.

$$h_n = 0.0006 \times 10/0.0027$$
$$= 2.2 \text{ ft.}$$

The fractional elevation of the neutral plane, a, is $$a = h_n/h_t$$
$$= 2.2/10$$
$$= 0.22$$

From the tabulation cited earlier the factor $k_4$ is estimated to be about 0.85.

The above analysis applies generally if extraneous sources of air flow into or out of the room are negligible, as extraneous air flows change the position of the neutral plane in an unpredictable manner.

Having determined the Effective Worst Cast Leakage Rate, the next step is to calculate the corresponding Worst Case Maximum Hold Time, which is the primary reason for this whole procedure. For this calculation a distinction must be made between a room in which the Halon is stratified, and in which it is not. For a stratified Halon distribution, the hold time specifications are generally that the Halon concentration not fall more than a certain amount (usually 1%) below its initial value, up to a specified height from the ceiling (typically 10% of the total height), in less than a minimum time (usually 10 minutes). For purposes of this discussion, since the room geometry is not always regular, let the space above the minimum height at which minimum concentration must be maintained be defined as the Maximum Unprotected Volume. Then the Estimated Worst Case Hold Time, and the criterion under this invention which determines whether a room passes or faisl the hold time requirement may be expressed:

$$\frac{\text{Maximum Unprotected Volume}}{\text{Effective Worst Case Leakage Rate}} = \text{Estimated Worst Case Hold Time}$$

Pass/Fail Criterion

Estimated Worst Case Hold Time ≧ Minimum Specification Hold Time.

If the worst case hold time first determined does not pass this criterion, steps will need to be taken to increase the Effective Worst Case Leakage until the criterion is met. This will usually entail eliminating leaks, but another approach is to modify conditions to favorably alter the factors $k_1$ to $k_4$, etc.

For the case of rooms with internal mixing to provide a generally uniform concentration of Halon, the following equations apply.

$$C = \exp(-(\text{EWCL})/V) \times t \times c_o$$

and $$t = (-\ln (C/C_o)) \times V/\text{EWCL}$$

where $C_o$ and C are the concentrations initially and after time, t

EWCL is The Effective Worst Case Leakage rate, CFM

V is the room Volume, cu. ft.

t is the time required for concentration to fall from $c_o$ to C, min.

Since the procedure is not yet in general use, no specific criteria have been established to determine whether a given room meets hold time specifications. However, by analogy with the stratified Halon case, the folllowing criteria area considered reasonably equvalent for the uniform concentration case:

t ≧ minimum specification hold time (stratified Halon case) $c - c_o$ ≧ maximum specification concentration drop (stratified Halon case)

The following example provides a comparison of the stratified and uniform concentration cases, as applied to room conditions in Test No. 4 of the Test Chamber experiments.

$V$ = 640 cu. ft., $C_o$ = 6.0% Halon, room h = 8 ft.

$k_2$ = 1 + 12/8 = 2.5; other $k$'s assumed to be 1.0 (stratified case)
= 1.0; other $k$'s assumed to be 1.0 (uniform concentration case)

So for the stratified Halon case in this room $$\text{Effective } WCML = 8.1 \times 2.5$$
$$= 20.25\ CFM$$

Assuming the maximum unprotected volume to be ⅛ of 640, or 80 cu. ft. (i.e. 1ft. down from ceiling)

$$\text{Worst Case Maximum Hold Time} = 80/20.25 = 4.0 \text{ min.}$$

This is close to the measured value actually obtained in the test chamber, 4. So the test chamber would fail the hold time spciication of 110 minutes under stratified Halon conditions. For uniform concentration conditions $$\text{Effective } WCML = 8.1 \times 1.0 = 8.1\ CFM$$

The concentration, C, after 10 minutes is $$C = \exp(-(8.1/640) \times 10) \times C_o = 0.881 \times 6.0 = 5.29\%$$

Or, the time for C to fall from 6.0 to 5.0% is $$t = (-\ln(C/C_o) \times (V/EWCL) = (-\ln(5.0/6.0) \times (640/8.1) = 0.182 \times 79.0 = 14.4 \text{ min.}$$

So with air circulation to provide uniform mixing of Halon with the air, the room would easily pass either the concentration or the hold time criteria. Although mixing per se has been previously disclosed as a means of distributing Halon to all parts of an enclosure, no previous disclosure is known of this advantage if mixing. Nor is there any known previous disclosure of a metho to predict the pass/fail performance of an enclosure with interior mixing.

Having determined the leakage flow equation for an enclosure, the equivalent leakage area may be calculated. This is the area of a hole in a thin flat plate which would have the same leakage rate as all of the leaks of various sizes and shapes in the enclosure envelope. It is calculated using the following relationship:

$$K \times A \times H^{\frac{1}{2}} = C \times H^N$$

or $$A = C \times H^N / K \times H^{\frac{1}{2}}$$

where $A$ = equivalent leakage area, sq. in.

$K = 3.998 \times ((459.7 + t)/(\text{bar. pres.}))^{\frac{1}{2}}$; $t$ = °F., bar. pres. = in. Hg
= 16.82 at $NTP$ $C,N$ = constants of leakage flow equation
$H$ = gravitational pressure head, in. $WC$ Equivalent leakage area is useful concept in physically visualizing the sum total of leaks in an enclosure.

A further application of this invention is to provide information on pressure surges which are generated in computer rooms during injection of Halon, and which might damage the building structure. If 6.38 volumes of Halon gas were injected into a room containing 100 volumes of air, at room temperature, the concentration of the resulting mixture would be just 6% by volume. But the pressure in the room (assumed leak proof) would be increased by a factor of 1.0638, for an increase of 0.9 psi, or 26.0 in. WC. This would certainly damage the structure of an ordinary building. Actually, in a fire extinguishing system, the Halon is injected as a liquid, which vaporizes and thereby cools the mixture, and this tends to reduce the volume. To compare the magnitude of these effects a heat balance was made, using lb. BTU and ° F. units. The following available values of physical constants were used:

| | | |
|---|---|---|
| Halon: | Boiling point | −72° F. |
| | Heat of vaporization at BP | 51.1 BTU/lb. |
| | Specific heat, liquid | 0.208 BTU/lb./°F. |
| | Specific heat, vapor | 0.112 BTU/lb./°F. |
| Air: | Specific heat, gas | 0.240 BTU/lb./°F. |

The final temperature of the mixture, under adiabatic conditions, was calculated to be 25.2° F., or about 45 degrees below room temperature. The volume at this temperature would be $$\text{Volume at } 25.2° \text{ F.} = ((459.7 + 25.2)/(459.7 + 70)) \times 106.38 = 97.38$$

So the resulting (adiabatic) volume would actually be less than the original air volume of 100. If carried out in a sealed room (zero leakage), the pressure in the room would be reduced relative to its initial level by the following amount:

$$\text{Pressure reduction} = ((100 - 97.38)/100) \times 407.1 = 10.7 \text{ in. } WC$$

The actual temperature drop which has been observed in actual computer rooms as well as in test chamber experiments is generally in the range of 10°-25° F., which is much less than the 45° F. drop calculated for adiabatic conditions. Similarly the general pattern of pressure changes we have observed is illustrated by the accompanying drawings where FIG. 5A relates to test chamber run no. 8 and FIG. 5B relates to a test actual computer room. During the initial part of the discharge period, which is generally about 10 seconds or less in duration, the pressure drops to a negative value, then rises to a positive peak, then gradually talis off more slowly in the period after the discharge. A further observation is that if the original humidity is sufficiently high, fog usually forms during the injection period, but this generally disperses in the ensuing minutes. Even if no fog forms, we have observed that relative humidity (or, more accurately actual moisture content) of the air in the room drops, and then more gradually returns to near its original level. According to this invention we interpret this behaviour to result from the interaction of the following principal factors:

The heat of vaporization of Halon liquid
The volumes of air and Halon vapor
Rapid transfer of heat from the air/Halon mixture to surfaces inside the room. Heat transfer is facilitated by the turbulent conditions prevailing during Halon injection
Condensation of moisture, with or without fog formation, and its deposition on interior surfaces of the room, also contribute to the high rate of heat transfer Temperature changes resulting from the above effects, and the volume of the injected Halon vapor, combine to produce pressure variations in the enclosure space, and this pressure is dissipated through leakage sites in the enclosure envelope.

This is a very complicated system which is difficult to express mathematically. This invention provides a simplified, but useful mathematical model expressed as follows:

Let V(s) be the volume of the air/Halon mixture as a function of time, s, from the beginning of the duration of the discharge to the time of its completion, $s_f$:

$$V(s)=V_o(1+(\%\text{Hal}'/100)\times s/s_f)\times(459.7+t(s))/(459.7+t_o)$$

where $v_o$=enclosure volume, cu. ft.

% Hal'=volumes Halon per 100 volumes air, to give % Hal conc.

s=time from start of Halon injection, sec.

$s_f$=time to finish of Halon injection, sec.

t(s)=air/Halon mixture temperature at time s; °F.

$t_o$=initial air temperature, °F.

Halon injection is assumed to occur at a generally constant rate. The key to application of this equation is estimation of the parameter t(s), based on the assumptions outlined above. According to the invention t(s) is generally of the form $$t(s)=t_o-(3243/(h_t\times R\times s_f))\,(1-e^{-(h_t\times R\times s)/(70.34)})$$

where

R=the surface to volume ratio of the enclosure, ft.$^2$/ft.$^3$ $h_t$=heat transfer coefficient from air/Halon mixture to interior surfaces of room, during turbulent period of Halon injection. Appropriate values are generally in the range of 20–40 BTU/ft.$^2$/hr./°F.

The numerical values given in the equation are for $t_o$ of about 70° F. and 6% Halon by volume. Appropriate adjustments can be made for conditions differing from these.

Figure 5A:
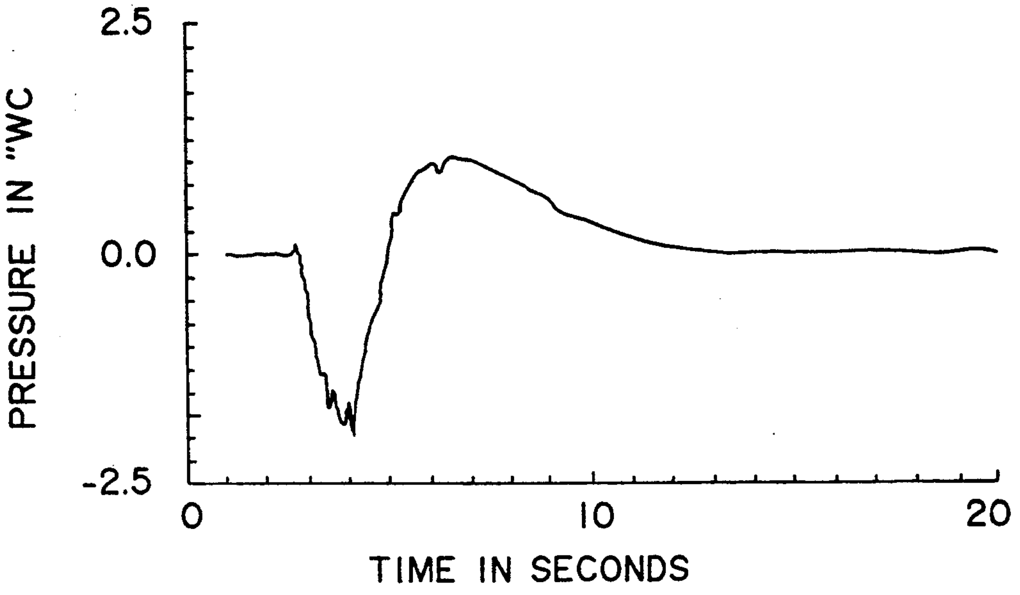
FIG. 5A and 5B show typical pressure/time profiles during Halon discharge.
Figure 5B:
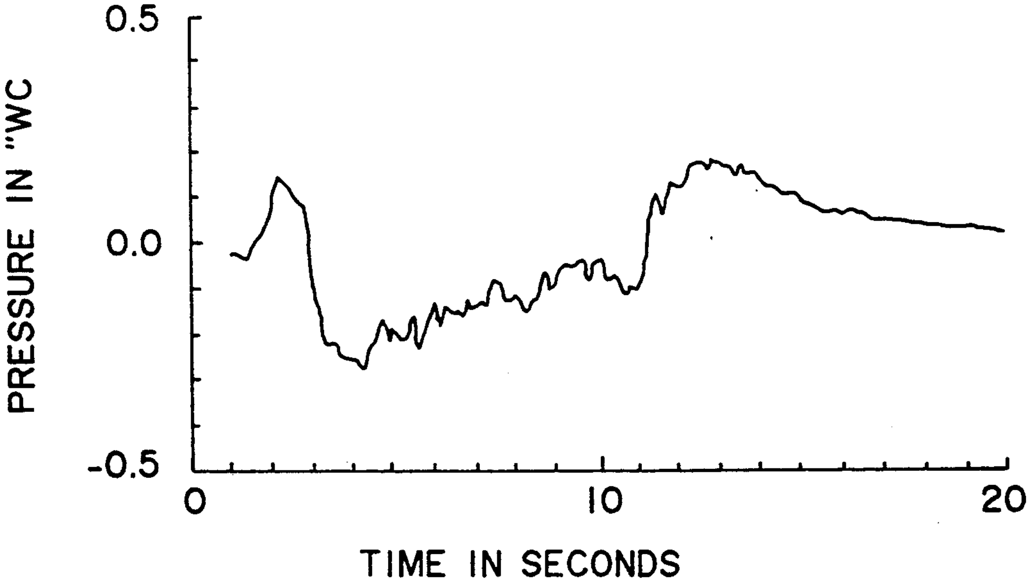
Figure 6:
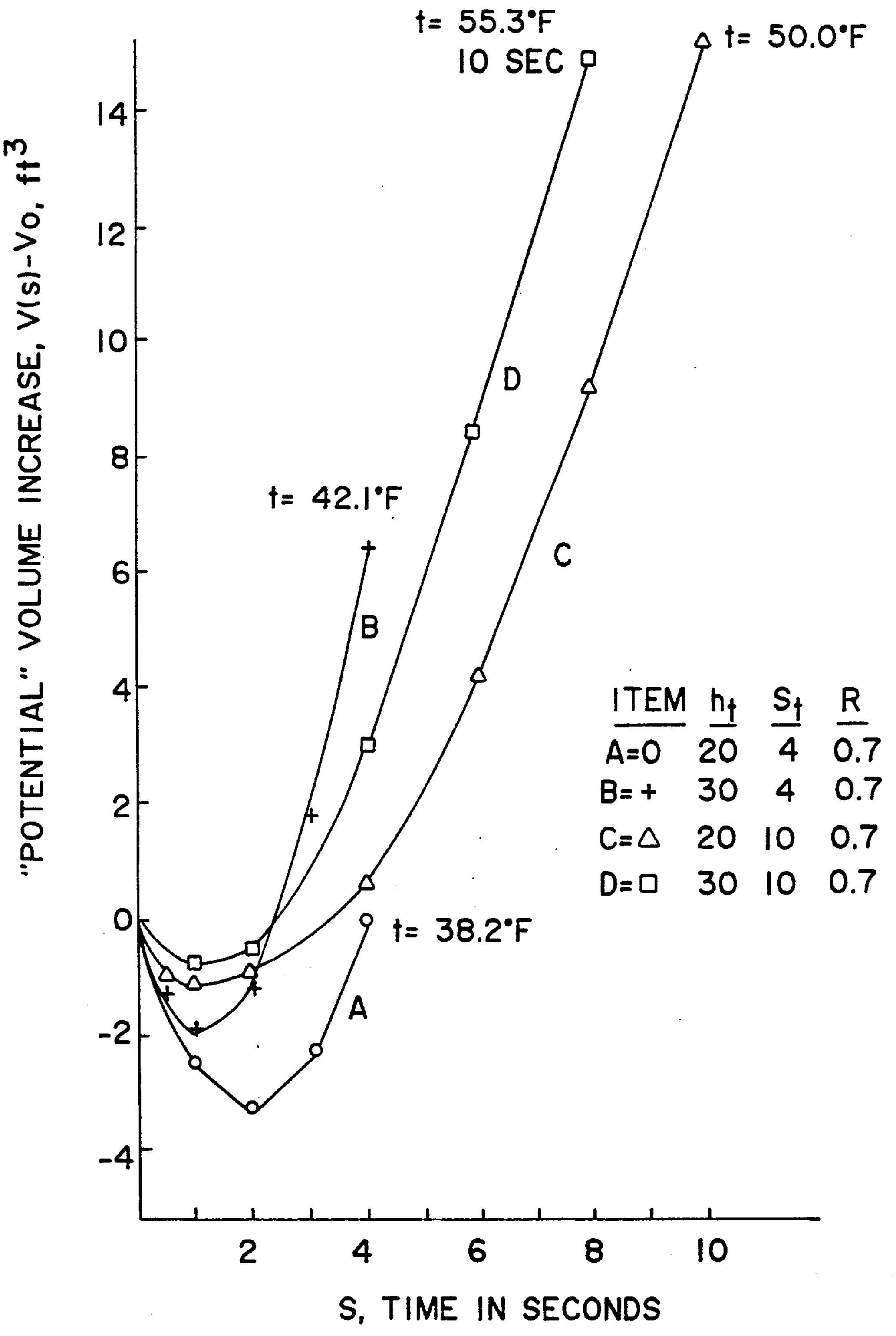
FIG. 6 shows calculated volume change with time during Halon discharge.
Figure 7A:
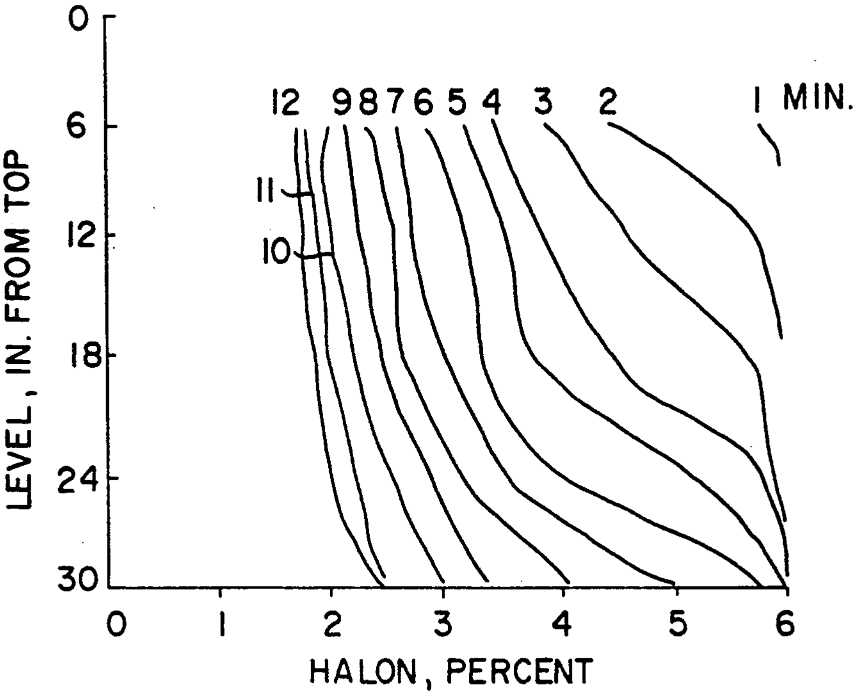
FIG. 7A through 7D are an illustration of the different aspects of the way the Halon concentration profile in the upper part of the enclosure changes with time as obtained from experimental data to be contrasted with the assumed "plug-flow" behaviour.
Figure 7B:
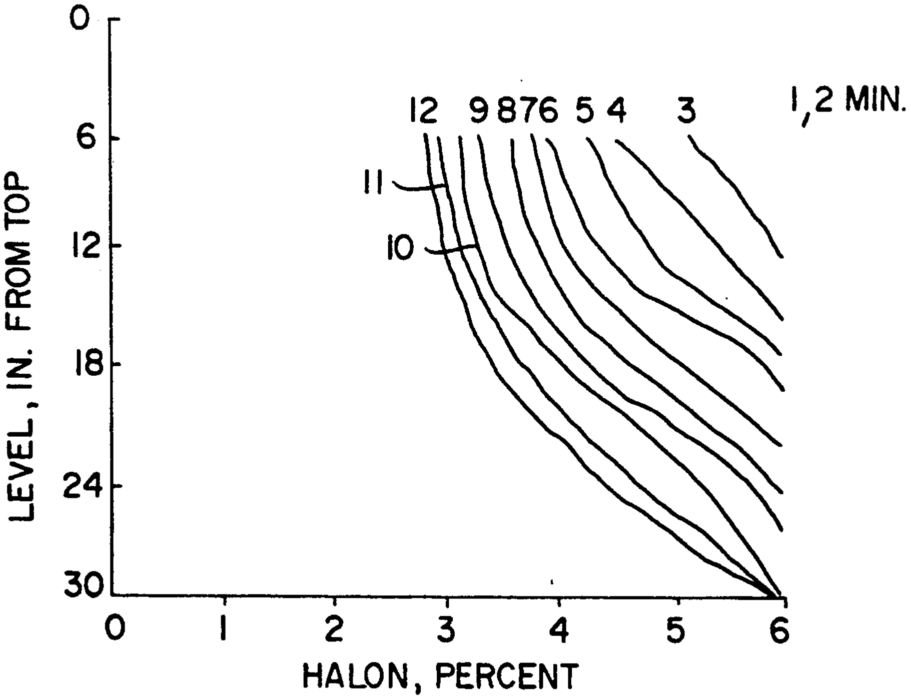
Figure 7C:
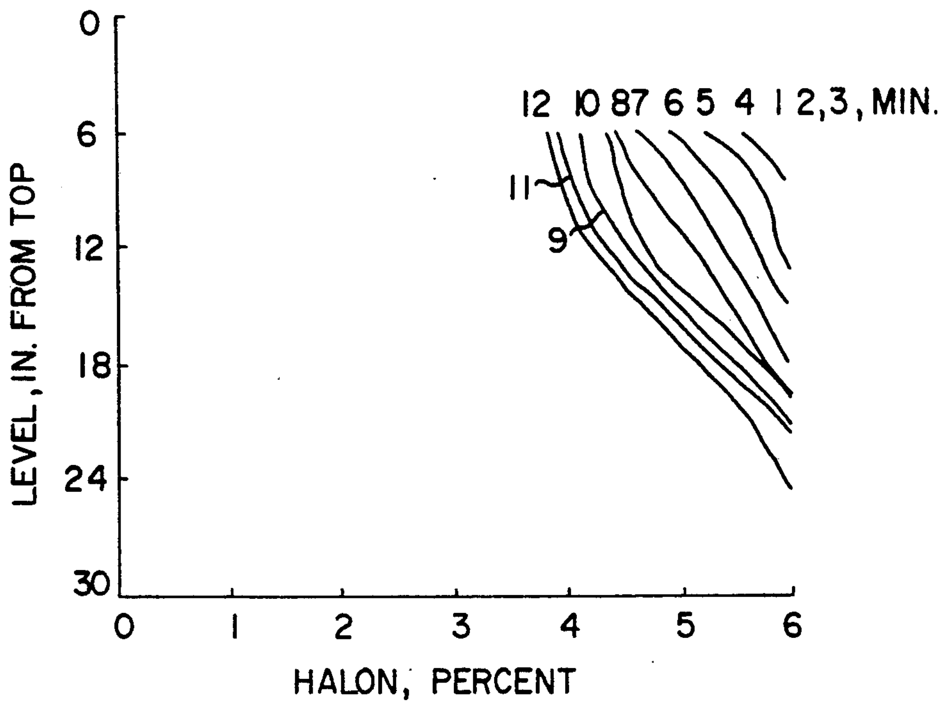
Figure 7D:
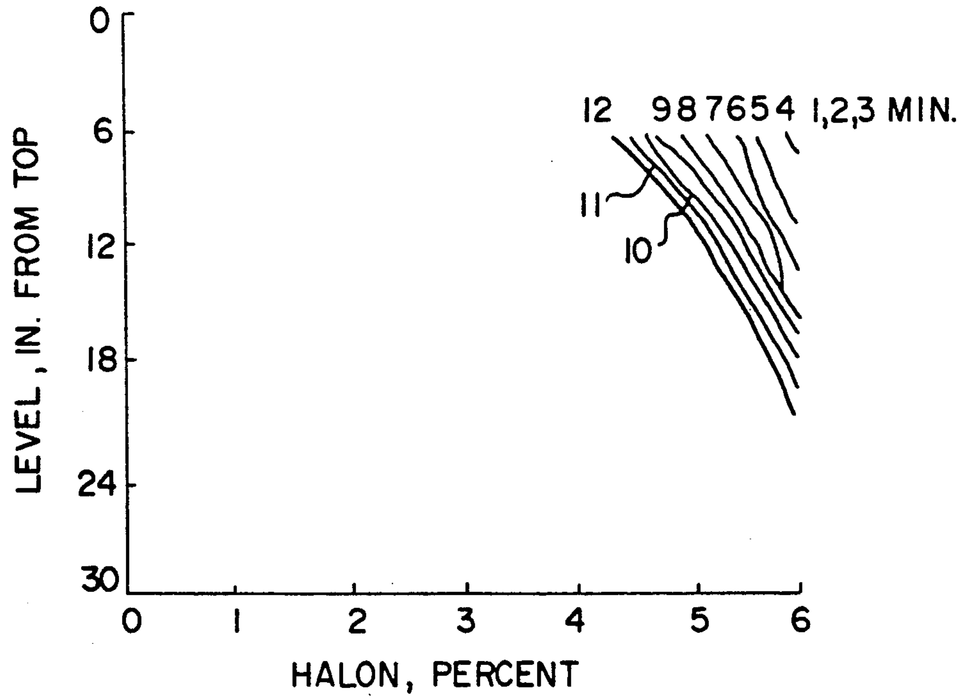
Figure 8A:
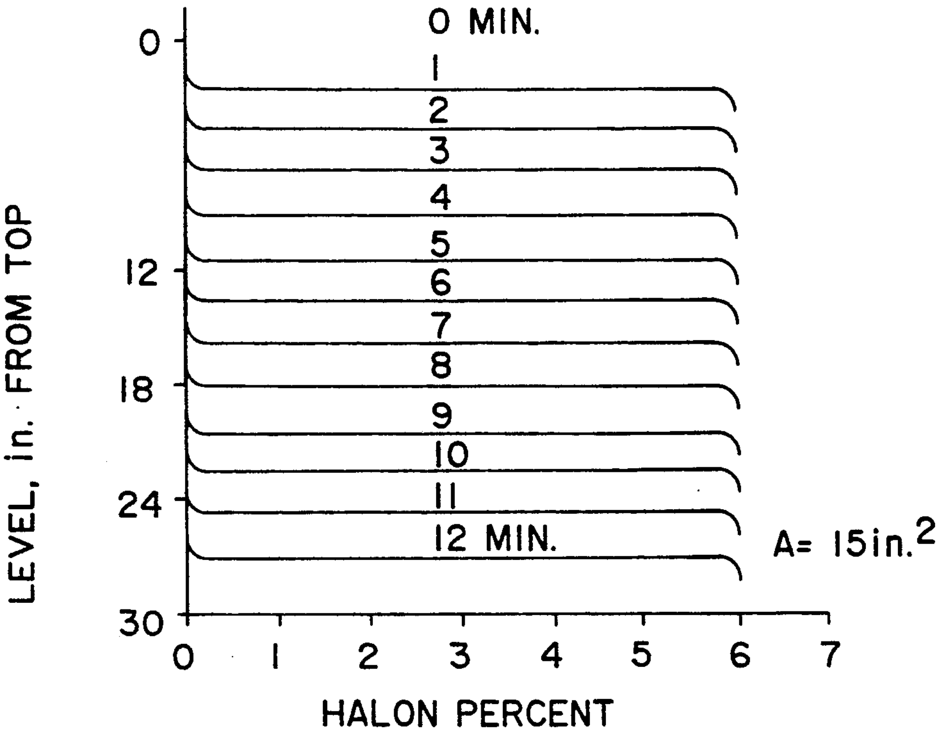
FIGS. 8A through 8D have caculated profiles showing the "idealized" type plug flow behaviour of FIG. 7.
Figure 8C:
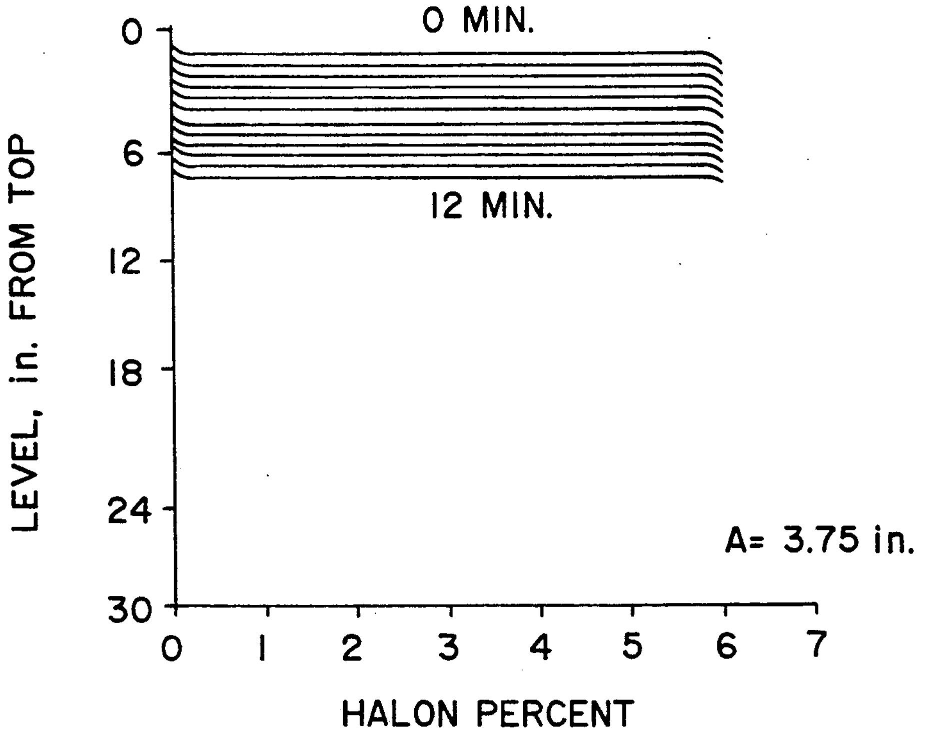
Figure 8B:
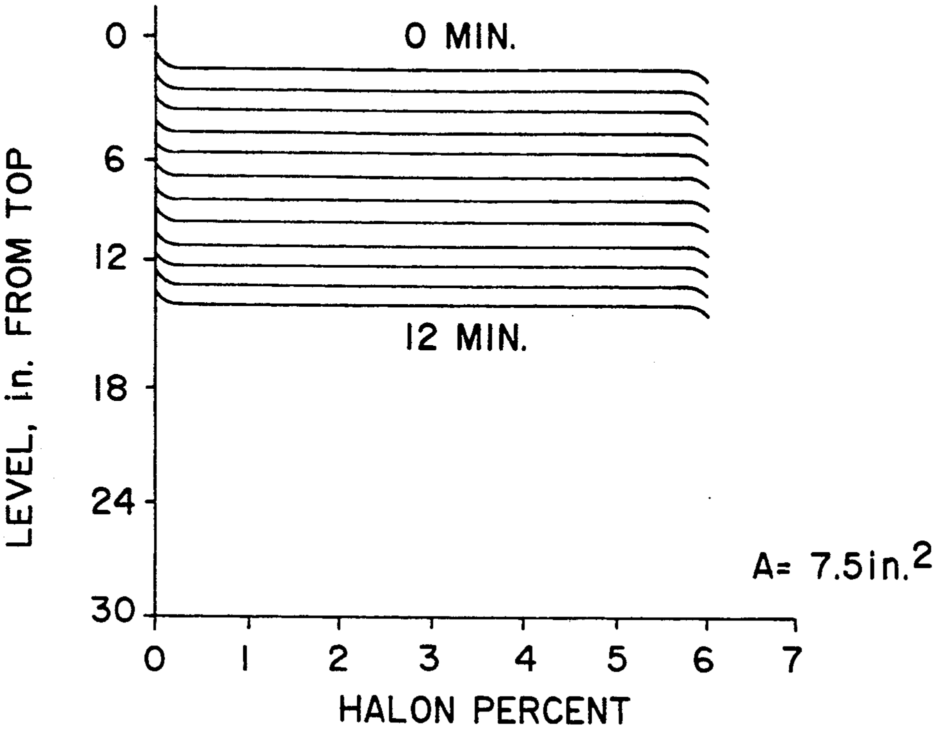
Figure 8D:
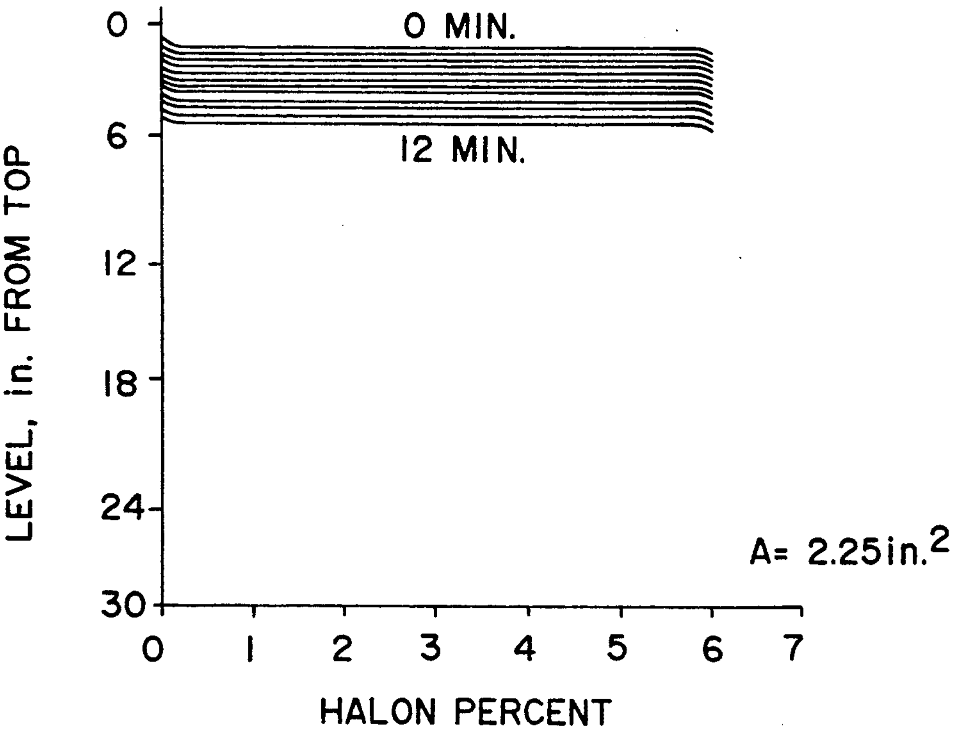

Volume change, $V(s)-V_o$, as a function of time is shown for a variety of conditions on accompanying FIG. 6. The calculated values show the characteristic initial dip followed by a rise as also noted experimentally in FIG. 5. Note also that the calculated final temperatures are more nearly in line with observed values than the minimum (adiabatic) temperature mentioned earlier.

For the case under discussion, the volume of the final gas mixture would be the same as the room volume at a temperature of 38.2° F. Deviations from this temperature represent potential changes in the volume $V_f$:

$$V_f=V_o\times(459.7+t_f)/(459.7+38.2)$$

The equilibrium pressure in the room (where rate of volume change balances rate of leakage out of the enclosure) is given by:

$$P_{eq}=((60\ V_f)/(16.8\times A\times 0.8\times s_f))^2$$

where $P_{eq}$ = equilibrium peak pressure, in. *WC*

$A$ = equivalent leakage area, sq. in.

$V_f$ = volume of gas mixture at final time of discharge, cu. ft.

-continued $s_f$ = duration of Halon injection, seconds

Calculated values of $P_{eq}$ are given in the following tabulation, for the test chamber with $V_o$ of 640, A=3.75, 7.5 and 15.0 sq. in., and $s_f$=4 and 10 seconds, and various final temperatures.

Equilibrium Pressures in Test Chamber
NTP, 6% Halon by Volume

| A: | 3.75 | | 7.5 | | 15.0 | |
|---|---|---|---|---|---|---|
| $A/V_o$ | 0.0059 | | 0.0117 | | 0.02334 | |
| $s_f$ | 4 | 10 | 4 | 10 | 4 | 10 |
| $t_f$ F. | Equilibrium Peak Pressure, $P_{eq}$ | | | | | |
| 38.2 | 0.0 | 0.0 | 0.0 | 0.0 | 0.0 | 0.0 |
| 45 | 6.8 | 1.1 | 1.7 | 0.3 | 0.4 | 0.1 |
| 50 | 20.4 | 3.3 | 5.1 | 0.8 | 1.3 | 0.2 |
| 55 | 45.5 | 7.5 | 11.7 | 1.9 | 2.8 | 0.5 |
| 60 | 69.5 | 11.1 | 17.4 | 2.8 | 4.3 | 0.7 |

Calculated $P_{eq}$ values are not intended to be exact, but to show trends. High pressures are associated with:

| | |
|---|---|
| High $t_f$; | result from increased heat transfer to room interior |
| Low A; | lessens rate of pressure dissipation (For other room sizes compare ratio $A/A_o$) |
| Low $s_f$; | higher injection periods preferable |

Further refinement of the above calculations can be made by allowing for the cooling effect of generally adiabatic expansion. This would have a generally equalizing effect on $p_{eq}$ values.

EXAMPLE

Figure 2:
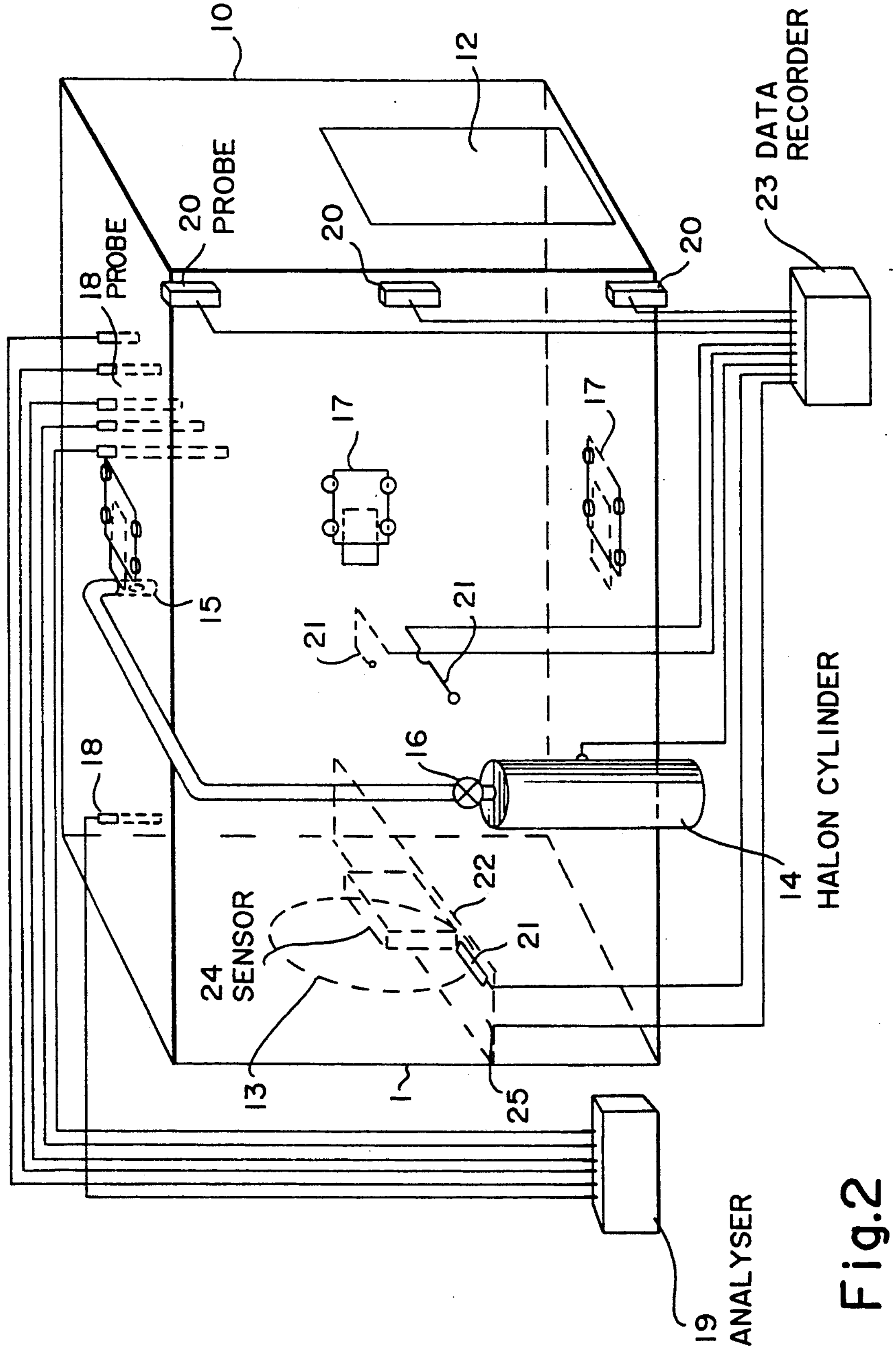
FIG. 2 shows the arrangement of equipment for conducting experiments in test chambers for Halon discharge tests.

The following sets forth examples pertaining to the subject invention in terms of tests on a particular enclosure. The test results of experiments in which Halon 1301 was discharged into an enclosure under a variety of condition are summarized in Table 1 below. The experimental setup is shown in FIG. 2. The enclosure was a generally air-tight chamber 10 of room size. Door 12 of chamber 10 was sealed but window 13 allowed observation of the interior of the chamber during a test. During the tests, a weighed amount of Halon contained in cylinder 14 was injected into chamber 10 through nozzle 15 by opening valve 16. The air/Halon mixture within the chamber 10 immediately began to leak out and a corresponding volume of air flowed in through leak openings 17. These leak openings 17, as is better shown in FIG. 3, were adjustable in size and were located on the top, the middle of the side wall and at the bottom of the chamber 10. As the air/Halon interface dropped its concentration profile was sampled by the multiple sensing probes 18 extending from the top of the chamber varying distances, generally from about 6 to about 30 inches. Data from sensing probes 18 was analyzed by multipoint percent Halon analyzer 19. Pressure probes 20 were located at the top, middle and bottom of the chamber. Temperature probes 21 were positioned to measure the outside air temperature, the inside air temperature, the inside chamber wall temperature and the cylinder wall temperatures. Humidity sensing probe 22 was located within chamber 10. Probes 20, 21 and 22 were connected to data recorder 23. Humidity was also determined by a sensor 24 mounted on shelf 25.

Figure 3A:
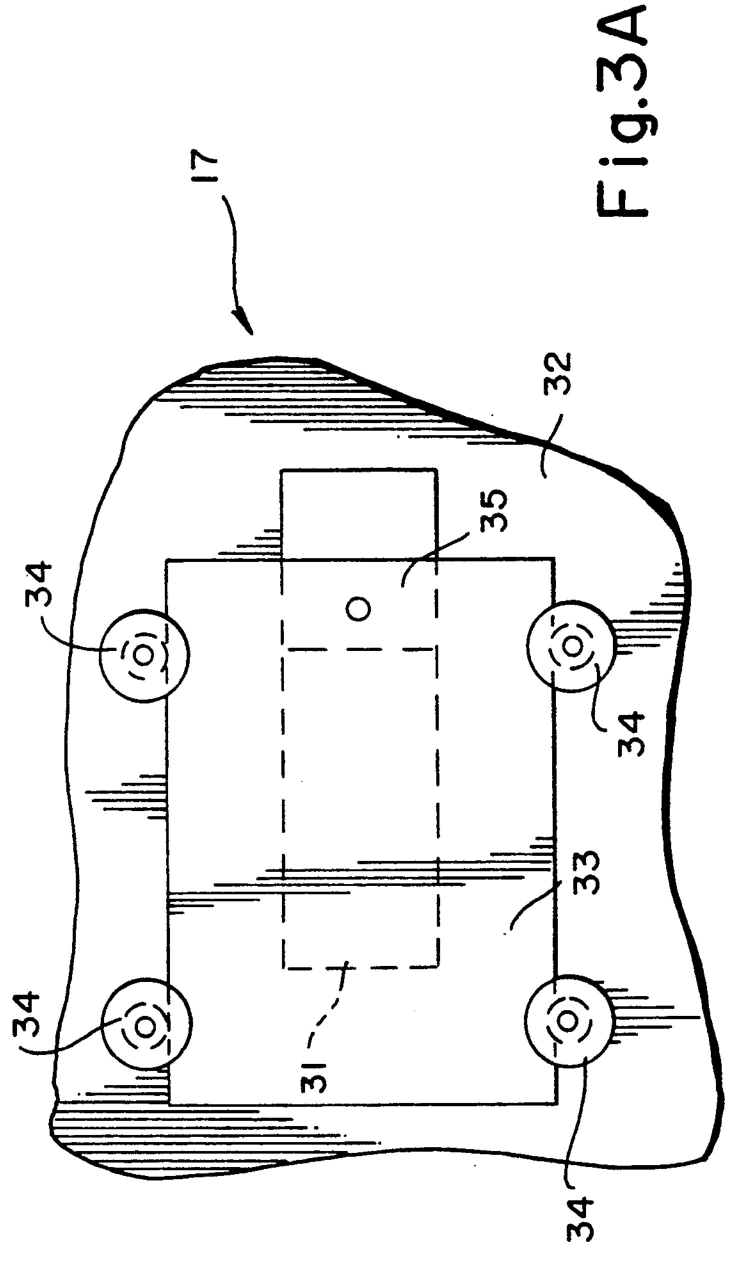
FIGS. 3A abd 3B are detailed views of an adjustable area leakage openings in the wall of a test chamber.
Figure 3B:
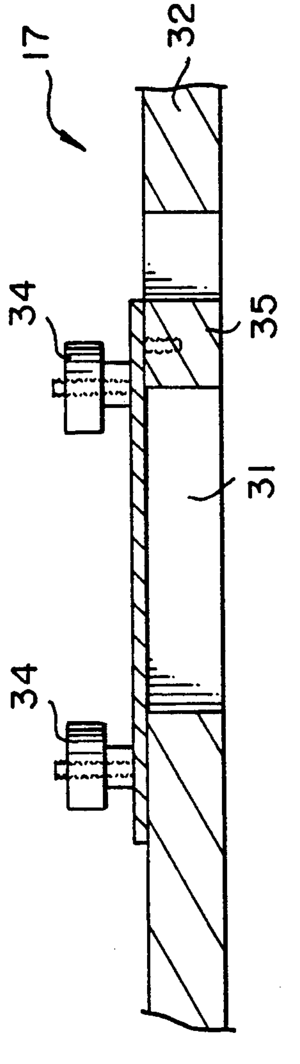

The specific construction of leak openings 17 located in the walls of chamber 10 are more clearly illustrated in FIG. 3. Leak opening 17 includes aperture 31 in wall 32 of chamber 10 and serves to control the flow of gas through the aperture by varying its size. Leak opening 17 comprises plate 33 slidingly held by knobs 34 and secured to fairing block 35 located within aperture 31. The position of slider plate 33 can be varied so as to adjust the effective size of aperture 31 by loosing knobs 34, moving the plate and then securing the knobs against the plate.

Table 1 summarizes results of experiments carried out in the test chamber of FIG. 2 regarding the movement of the air/Halon boundary while varying parameters such as area and location of leaks, temperature and humidity. In these experiments, the target Halon concentration of 6.0% was not always attained as shown and the results have been normalized to 6.0% by adjusting for gas density. Experiments covered a range of temperatures from 68 to 77 degrees F., a range of humidities from 12 to 64 percent, a range of total leakage area drom 2.25 to 15.0 square inches and a distribution of leakage areas from top, middle and bottom. In tests nos. 1 through 13, the air/Halon mixture formed a boundary layer as air/Halon mixture leaked out of the chamber. In test nos. 14 and 15, the effect of uniform top to bottom concentration attained by internal mixing, as by use of a circulating fan, is illustrated.

TABLE 1

| Test No. | 1 | 2 | 3 | 4 | 5 | 6 | 7 | 8 |
|---|---|---|---|---|---|---|---|---|
| Halon % | 6.10 | 6.15 | 6.26 | 6.30 | 7.13 | 6.52 | | 6.00 |
| Temp. F. | 69 | 69 | 68 | 70 | 70 | 77 | | 69 |
| RH % | 37 | 22 | 12 | 49 | 64 | 32 | | 41 |
| Leak Area (in$^2$) | | | | | | | | |
| Top | 3.75 | 3.75 | 3.75 | 3.75 | 3.75 | 3.75 | | 1.88 |
| Middle | 0.00 | 0.00 | 0.00 | 0.00 | 0.00 | 0.00 | | 0.00 |
| Bottom | 3.75 | 3.75 | 3.75 | 3.75 | 3.75 | 3.75 | | 5.63 |
| Total | 7.50 | 7.50 | 7.50 | 7.50 | 7.50 | 7.50 | | 7.50 |
| Leak Time (1) min. | | | | | | | | |
| 6" | 2.5 | 3.5 | 3.5 | 3.5 | 2.5 | 2.5 | | 3.5 |
| 12" | 4.5 | 4.5 | 5.0 | 4.5 | 4.5 | 4.5 | | 5.5 |
| 18" | 6.5 | 7.5 | 6.5 | 7.5 | 6.5 | 6.5 | | 7.5 |
| 24" | 9.5 | 10.5 | 10.5 | 11.5 | 9.5 | 9.5 | | 11.5 |
| 30" | 12+ | 12+ | 12+ | 12+ | 12+ | 12+ | | 12+ |
| Leak Time (2) min. | | | | | | | | |
| 12" | | | | 11.5 | | | | 17.0 |
| Calculated leakage rate (3) CFM | | | | | | | | |
| 12" | | | | 8.1 | | | | 5.2 |
| Calculated Time (4) min. | | | | | | | | |
| 12" | | | | 9.9 | | | | 15.4 |

| Test No. | 9 | 10 | 11 | 12 | 13 | 14 | 15 |
|---|---|---|---|---|---|---|---|
| Halon % | 6.15 | 5.97 | 5.85 | 6.82 | 5.13 | 6.00 | 6.00 |
| Temp. F. | 68 | 70 | 74 | 72 | 71 | 70 | 70 |
| RH % | 38 | 36 | 36 | 41 | 34 | 40 | 40 |
| Leak Area (in$^2$) | | | | | | | |
| Top | 5.63 | 2.63 | 1.88 | 7.50 | 1.13 | 3.75 | 7.50 |
| Middle | 0.00 | 2.23 | 0.00 | 0.00 | 0.00 | 0.00 | 0.00 |
| Bottom | 1.88 | 2.63 | 1.88 | 7.50 | 1.13 | 3.75 | 7.50 |
| Total | 7.50 | 7.50 | 3.75 | 15.00 | 2.25 | 7.50 | 15.00 |
| Leak Time (1) min. | | | | | | | |
| 6" | 5.5 | 3.5 | 5.5 | 1.5 | 7.5 | 14.5 | 7.4 |
| 12" | 9.5 | 4.5 | 8.0 | 2.5 | 12.5 | 14.5 | 7.4 |
| 18" | 12+ | 7.5 | 12+ | 3.5 | 12+ | 14.5 | 7.4 |
| 24" | 12+ | 7.5 | 12+ | 5.5 | 12+ | 14.5 | 7.4 |
| 30" | 12+ | 12+ | 12+ | 7.5 | 12+ | 14.5 | 7.4 |
| Leak Time (2) min. | | | | | | | |
| 12" | 15.5 | 13.0 | 21.5 | 6.5 | 31.0 | 55.6 | 28.1 |
| Calculated leakage rate (3) CFM | | | | | | | |
| 12" | 5.2 | 5.7 | 4.04 | 16.2 | 2.43 | | |
| Calculated Time (4) min. | | | | | | | |
| 12" | 15.4 | 14.0 | 19.8 | 4.9 | 32.9 | NA | NA |

Notes:
*Calculated data based on use of a fan in test chamber to keep the air/Halon mixture uniformly distributed.
(1) Leak times for concentration to drop from 6% to 5% as measured by sensors whose position is measured from top of test chamber.
(2) Leak time for concentration to drop from 6% to 3% as measured by sensors whose position is measured from the top of the chamber.
(3) Calculated leakage rate for an 8 ft. column of 6% Halon and known leaks.
(4) Calculated time for the Halon level to drop past a sensor whose position is measured from the top of the test chamber.

Conclusions reached from the results in Table 1 were the following:

(1) Location of leaks as well as leakage area have a substantial effect on leakage rate (compare run 1 to runs 8–10).

(2) Humidity and temperature in the ranges tested have little apparent effect on the leakage rate (compare runs 1–6).

(3) Experimental leak times for the concentration to drop from 6% to 5% at a level of 12 inches from the ceiling agree poorly with calculated drop times assuming a sharp interface by diffusion and other factors, as discussed below.

(4) Experimental leak times for the concentration to drop on-half (from 6% to 3%) at the 12 inch level agree well with the calculated drop times. This also supports the concept of a broadening of the interface boundary. Furthermore, broadening is shown by the results of Table 1 to be of practical importance because it has a significant effect on the actual hold time during which a specified concentration of Halon is maintained at a specified level in a given enclosure.

(5) Tests numbers 14 and 15 demonstrate the result of assuming a fan or other means in the test chamber keeps the air/Halon contents uniformly mixed. In comparison with Test nos. 4 and 12, respectively, which have the same leak sizes and distribution, a several-fold advantage in 6% to 5% leak times is clearly apparent.

Further details regarding the tests described in Table 1 are contained in FIGS. 4 through 10.

Figure 4:
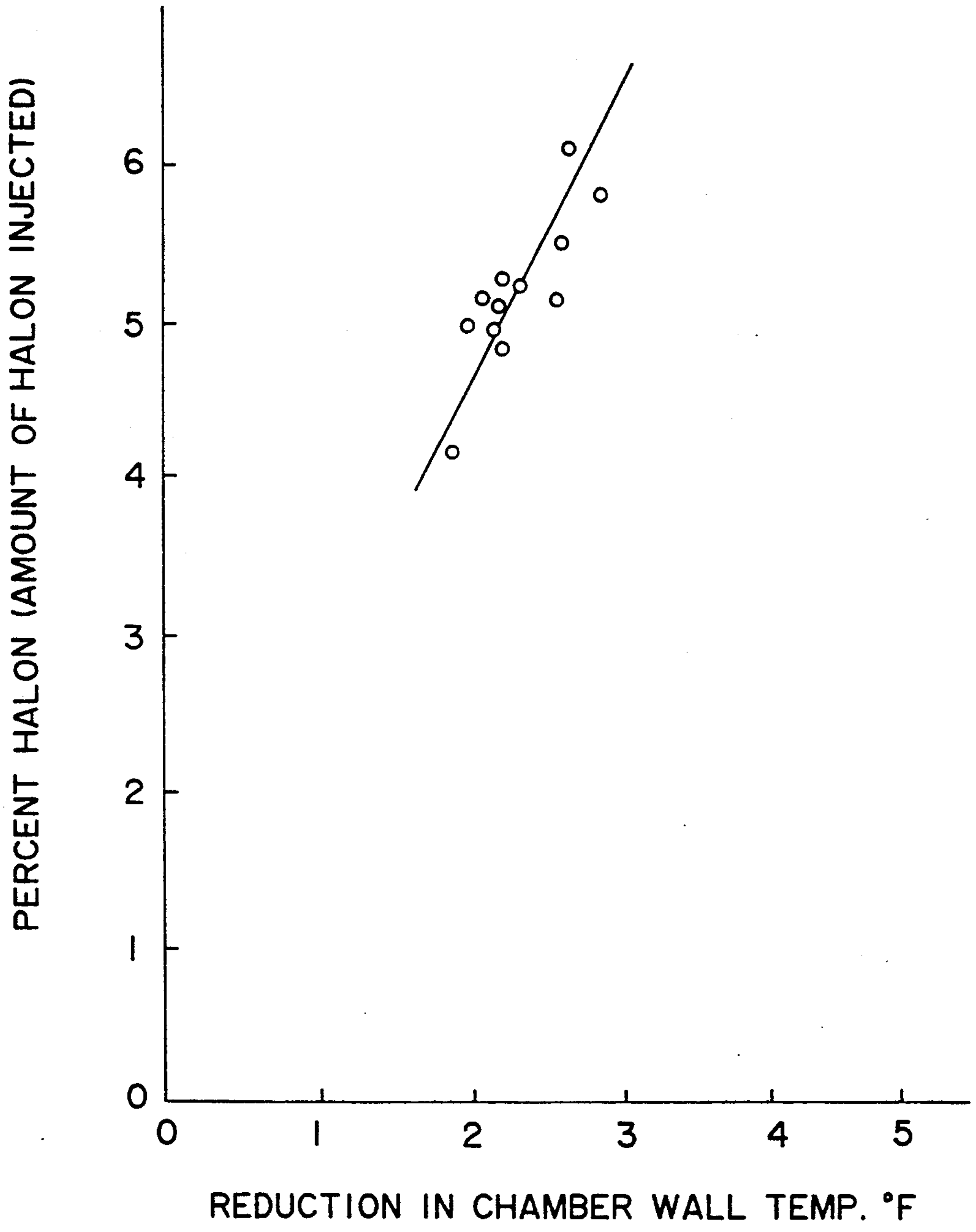
FIG. 4 shows the correlation between cooling of the test chamber walls and the amount of Halon injected so as to support the postulation of heat transfer from the air/Halon mixture to the wall.

FIG. 4 is a plot of initial percent Halon injected into the chamber in each test versus an accompanying observed drop in temperature of the chamber wall. This plot supports the postulation made previously herein that there is a rapid heat transfer from the turbulent gas mixture to the walls of the enclosure during Halon injection.

FIGS. 5A and 5B are typical pressure profiles during the Halon discharge tests. FIG. 5A is the trace on a sensor/recorder of the pressure difference inside and outside the chamber during and after Halon was injected into the chamber in test no. 8. This trace is typical in general of all the tests, and is characterized by a very small initial rise at the start of the Halon injection, followed by a substantial drop as the Halon vaporizes and mixes with air and cools the mixture, a sharp rise to a positive pressure and then a gradual tailing off of the pressure.

FIG. 5B is a trace similar to that of FIG. 5A, but made during a Halon discharge test in a much larger enclosure which was an actual computer room. The sequence of pressure changes is generally similar to that shown in FIG. 5A.

FIG. 6 shows calculated pressure difference versus time relationdship for a number of conditions by applying the mathematical model that was derived to account for the intial part of the actual pressure traces illustrated above in FIG. 5A. It can be noted that model accounts for an intial drop in pressure followed by a rise to a positive value. This positive pressure would be expected to tail off as gas leaked from the enclosure.

FIGS. 7A through 7D are graphical representations of the measured percent Halon for test nos. 12, 4, 11 and 13 respectively, each curve representing a profile of concentration as a function of distance from the ceiling after time intervals of 1 to 12 minutes. These curves show concentration changing from 0, indicating pure air layer, to 6.0, indicating the undiluted initial air/Halon mixture, over a range of distances from the ceiling. This range is indicative of a broad, diffuse interface rather than a sharp interface between the upper, lighter layer formed by air leaking into the chamber and the lower, heavier mixture of air and Halon. The amount of broadening observed is sufficient to significantly reduce the effective hold time as described above in the discussion of the data of Table 1.

FIGS. 8A through 8D show calculated concentration profiles at various levels versus time for various leakage areas. The plots are for the same leakage conditions as shown in FIG. 6 but assume a sharp non-diffuse interface. These plots illustrate what those in FIG. 7 would have looked like if there was no broadening of the boundary. Under these conditions, the hold times would have approximated those in the last line of Table 1.

Figure 9A:
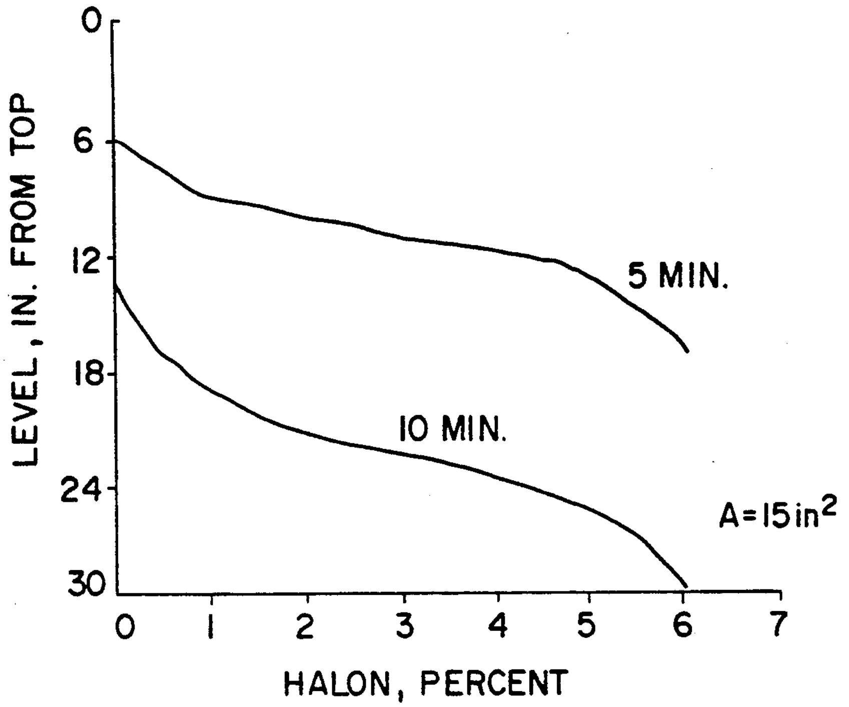
FIGS. 9A and 9B are a calculated profile with diffusion added so as to explain the factor $k_3$ subsequently discussed.
Figure 9B:
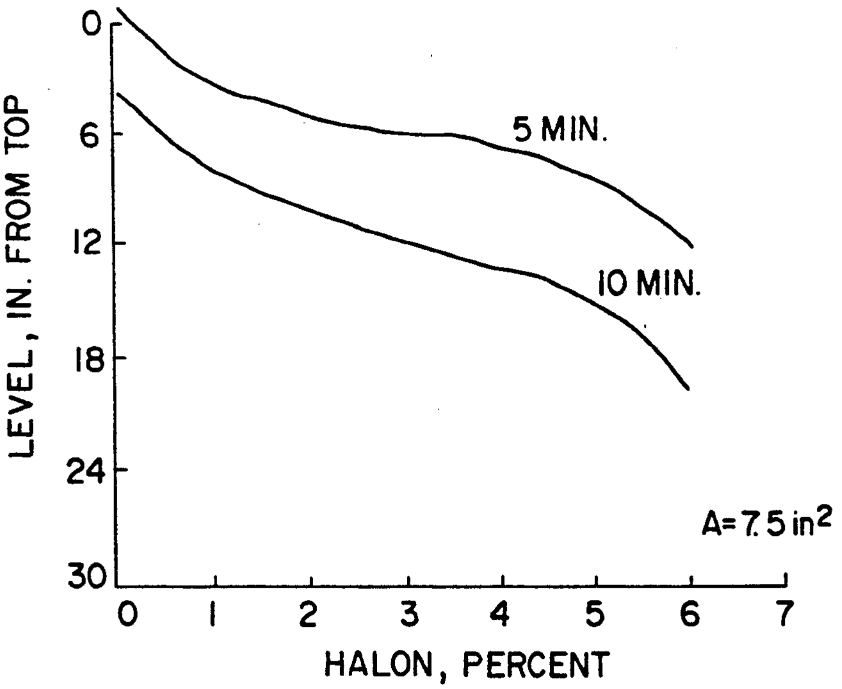
Figure 10A:
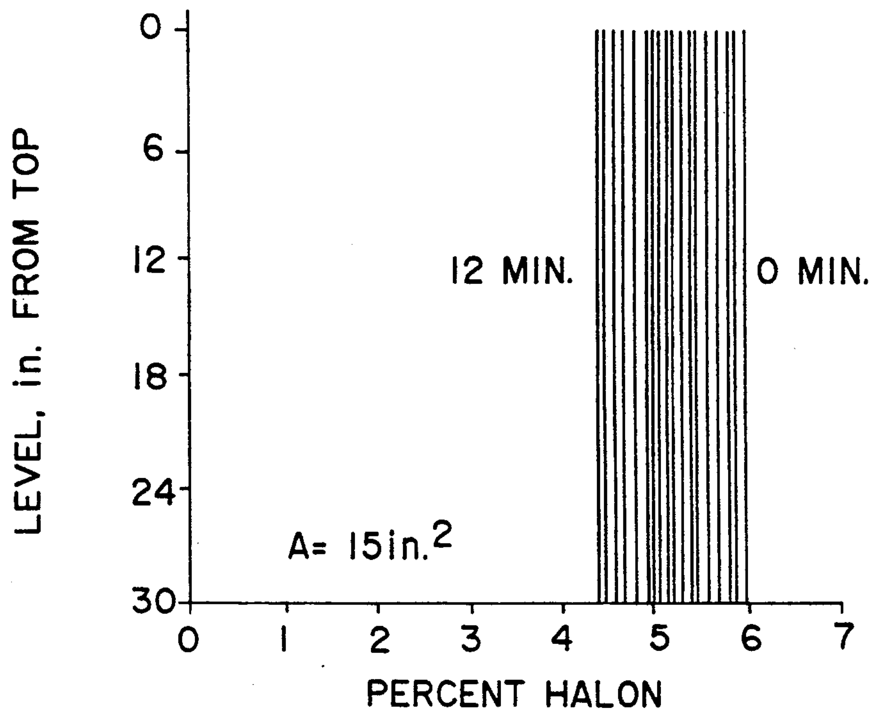
FIGS. 10A through 10D demonstrate the effect of providing mixing of an air and Halon mixture during the period in which it is leaking from an enclosure so as to show the effectiveness of a given concentration of Halon is substantially improved.
Figure 10C:
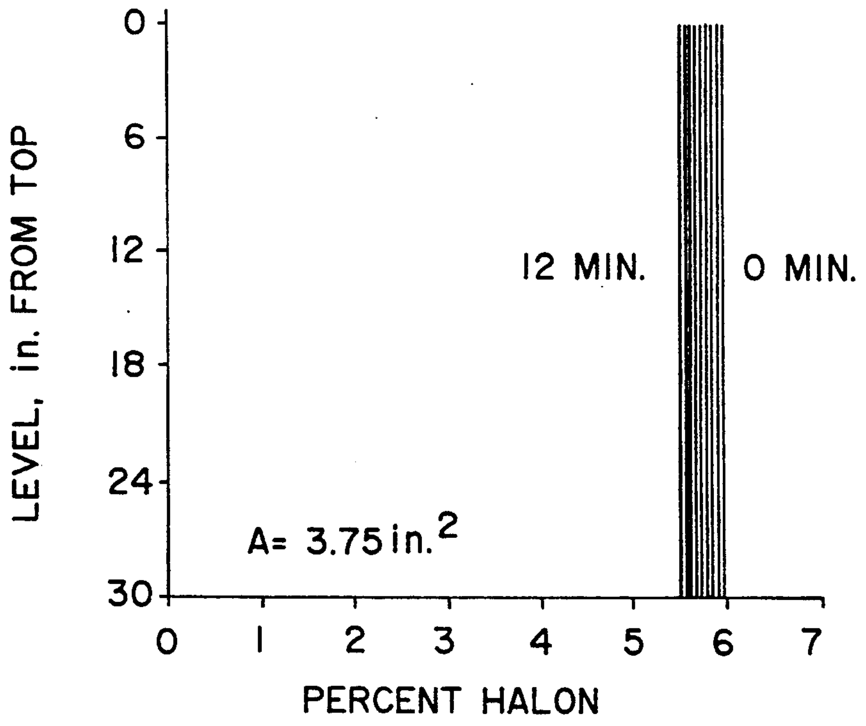
Figure 10B:
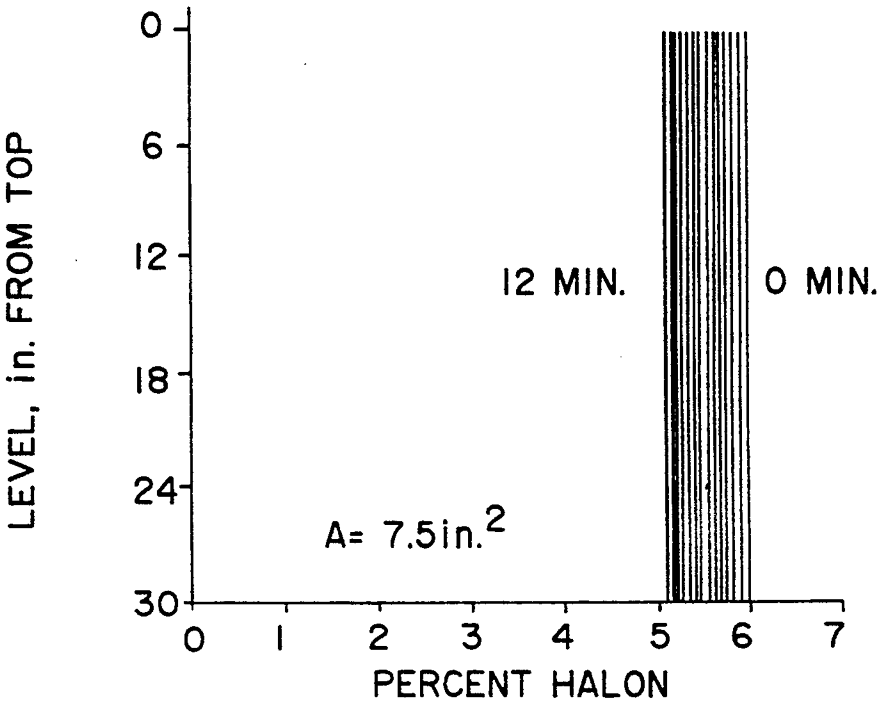
Figure 10D:
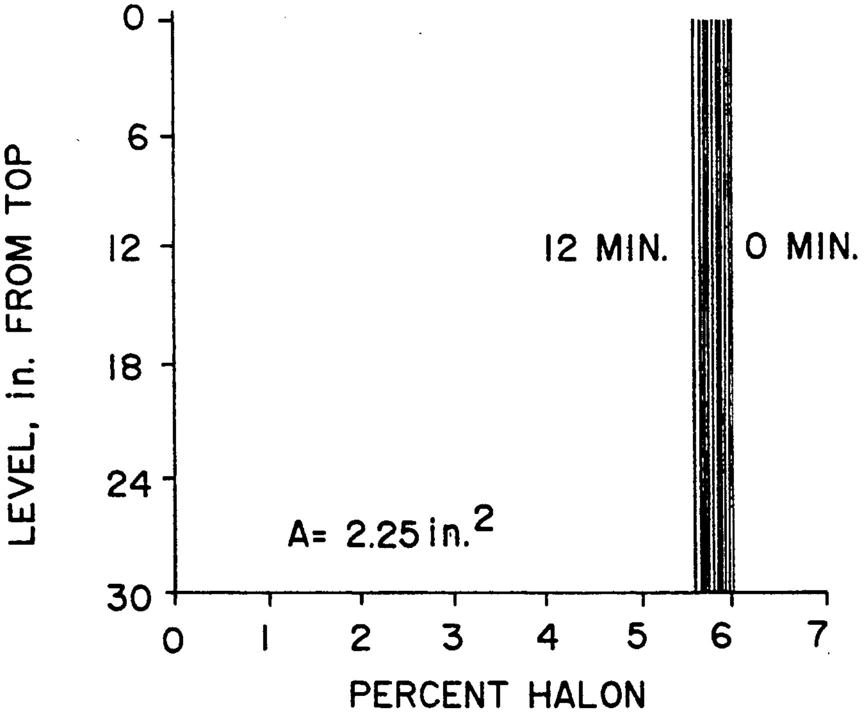

FIGS. 9A and 9B show calculated concentration versus level at various times under conditions as in FIGS. 7A, 7B, 8A and 8B but at times of 5 and 10 minutes only, and adding the effect of diffusion at the interface. The diffusion constant was estimated by extrapolation on a log-log values of known diffusion constants of molecularly similar substances versus molecular weight and was assumed to be 0.09 $cm^2$/seconds. These plots were interperted to mean that diffusion alone could not account for the degree of broadening indicated in FIG. 7.

FIGS. 10A through 10D show calculated Halon concentration versus level at various times under conditions of mixing rather than stratification of the chamber contents thus duplicating conditions in test nos. 15 and 14 respectively in Table 1. These Figures illustrate graphically the effects of mixing on the time required for concentration to fall below a given value at a given level, i.e., hold time, as demonstrated experimentally by the data of Table 1.

We claim:

1. Test apparatus for determining whether an enclosure containing articles of value susceptible to damage by fire and also by water is able to pass a hold time requirement in the performance specifications of a fire extinguishing system installed in said enclosure according to established standards, said fire extinguishing system acting by injecting and distributing a volatile extinguishing agent in an initially generally uniform manner throughout the enclosure, and requiring for effective action that a specified minimum concentration of the agent be maintained in specified regions of the enclosure for a specified minimum hold time, said test apparatus comprising:

pressure measuring means for measuring a pressure difference between locations inside and outside said enclosure, air transfer means for transferring air either into or out of the enclosure and simultaneously measuring flow rate with quantitative accuracy, said air transfer being accompanied by an opposite, compensating flow through leakage sites present in the enclosure, said air transfer means capable of generating a pressure within the enclosure sufficient to be accurately measurable by said pressure measuring means, and computer programmed to:

determine a predicted gravity head that would be developed from top to bottom of the enclosure relative to ambient air pressures outside of the enclosure at corresponding elevations if a specified amount of a volatile, heavier-than-air fire extinguishing agent was injected and distributed uniformly as a vapor with air in the enclosure, utilize flow versus pressure data from said air transfer means and said pressure measuring means to provide a worst case upper limit of flow through leakage sites in the enclosure at a pressure in a general range including one-half said predicted gravity head, and determine a worst case lower limit on the hold time that would prevail during an actual test of a fire-extinguishing system in the enclosure by including the effect of said worst case upper limit leakage rate during said hold time, concentration of the extinguishing agent determined to remain above a specified concentration in a specified region inside the enclosure, and said worst case lower limit hold time being greater than the minimum performance specification hold time providing assurance that the fire extinguishing system installed in said enclosure could pass said hold time requirement.

2. A test apparatus according to claim 1, in which the pressure measuring means includes a micromanometer reading in increments of no more than 0.001 in. WC and having a rated accuracy within about ±1%.

3. A test apparatus according to claim 1, in which the computer programmed to determine a lower limit on the hold time includes allowance for effects of location of a neutral pressure plane within the enclosure, said neutral plane being the horizontal level at which the pressures inside and outside the enclosure are essentially equal and its location being dependent on the distribution of leakage sites in the walls, floor and ceiling of the enclosure.

4. A test apparatus according to claim 1, in which the computer programmed to determine a lower limit on predicted hold time includes a determination of effects of diffusion and/or thermal convection currents to reduce a concentration gradient of the fire extinguishing agent at a boundary between a heavier lower gas layer derived from the initial air/agent mixture in the enclosure, and a lighter, upper layer derived from air entering the enclosure as air/agent mixture leaks therefrom.

5. A test apparatus according to claim 1 wherein said air transfer means is mounted in a generally air-tight manner in at least one opening in walls of the enclosure, said air transfer means capable of transferring air either into or out of the enclosure at an adjustable flow rate.

6. A test means according to claim 5, in which the air transfer means comprises one or more test devices known as blower doors, said devices calibrated to measure air flow rate with an accuracy of at least ±6%.

7. A test apparatus according to claim 1 wherein the air transfer means abruptly increases pressure in said enclosure by a release of a quantity of a gas into the enclosure, and flow characteristics of the leakage sites in the enclosure are determined from a rate of decay with time of said pressure inside the enclosure.

8. A test apparatus according to claim 7 wherein said air transfer means increases pressure by injection of a volatile liquid through the system provided to inject fire-extinguishing agent into the enclosure.

9. A test apparatus according to claim 1, in which the computer programmed to determine the gravity head incorporates effects of temperature of the air/agent mixture after injection of the fire extinguishing agent.

10. A test apparatus according to claim 9, in which the temperature of the air/agent mixture is assumed to be in the range of 10° to 30° F. below initial air temperature.

11. A test apparatus according to claim 9, in which the computer is programmed to determine the temperature of the air/agent mixture from a heat balance between the cooling effect due to vaporization of the fire extinguishing agent, and the warming effect due to heat transfer from the interior of the enclosure to the air/agent mixture.

12. A test apparatus according to determine claim 11, in which the computer is programmed to the temperature of the air/agent mixture by including effects due to the relative humidity of the air initially present in the enclosure.

13. A test apparatus according to claim 3, in which a worst-case location of the neutral plane is assumed about midway between the top and bottom of the enclosure.

14. A procedure to determine the location of a neutral plane in an enclosure having a height, said procedure comprising establishing within said enclosure a measurable gravitational pressure head relative to ambient conditions outside the enclosure, determining a total amount of said gravitational pressure head over the height of the enclosure, measuring the gravitational pressure head difference with respect to the outside of the enclosure at at least one elevation between the top and bottom of the enclosure, and determining said location from said total gravitational pressure head determination and pressure difference measurement.

15. A procedure according to claim 14, in which the gravitational pressure head is established inside the enclosure by means of a temperature difference of at least 10° F. between the inside and outside of the enclosure.

16. A procedure according to claim 14, in which said gravitational pressure head difference is measured with micromanometer having a sensitivity of at least ±0.0001 in. WC.

17. A fire extinguishing system for an enclosure containing articles having combustible components, said system being required for effective fire-extinguishing capability to maintain a specified minimum concentration of a fire-extinguishing agent in specified regions of the enclosure for a specified minimum hold time, the system comprising means for dispersing a volatile, heavier-than-air fire extinguishing agent in said enclosure, said system further comprising at least one gas moving means for circulating and mixing gaseous contents of the enclosure sufficiently to maintain a generally uniform mixture of air and fire-extinguishing agent throughout said enclosure said air moving means thereby reducing the quantity of said fire-extinguishing agent needed to achieve said specified minimum concentration of said agent in the specified regions of the enclosure for the specified minimum hold time.

18. An improved fire extinguishing system as in claim 17 in which said moving means are capable of being activated during a period in which the means for dispersing fire extinguishing agent is dispersing the agent in the enclosure.

19. A method for determining and avoiding structural damage from peak pressures that are generated in an enclosure having a fire extinguishing system which functions by injecting and distributing a volatile extinguishing agent in an initially generally uniform manner throughout the enclosure where the pressure in the enclosure during said injection generally falls initially to a negative value, then becomes positive, and then tails off, the method comprising transferring air either into or out of the enclosure and simultaneously measuring said flow rate with quantitative accuracy, said air transfer being accompanied by an opposite, compensating flow through leakage sites present in the enclosure, so as to generate a pressure difference between locations inside and outside the enclosure while measuring the pressure difference during said air transfer, and determining peak pressures from values of the flow and the pressure as an indication of possible structural damage to the enclosure upon activation of said fire extinguishing system when the volatile fire extinguishing agent is injected into said enclosure and if peak pressures so determined exceed safe limits, adding leakage openings to the enclosure to reduce said pressures to below the safe limits.

20. A method for estimating peak pressures according to claim 19, wherein the peak pressures are determined by including effects of total quantity and rate of injection of the fire extinguishing agent into the enclosure based on a heat balance between the cooling effect of the vaporization of the fire extinguishing agent and the warming effect of heat transfer from the interior of the enclosure to the gas mixture therein.

21. A method for estimating peak pressures according to claim 20, wherein the peak pressures are further determined by including effects due to relative humidity of air initially present in the enclosure.

22. A method for assuring that an enclosure containing articles of value susceptible to damage by fire and also by water will be able to pass a hold time requirement in the performance specifications of a fire extinguishing system installed in said enclosure according to established standards, said fire extinguishing system acting by injecting and distributing a volatile extinguishing agent in an initially generally uniform manner throughout the enclosure, and requiring for effective action that a specified minimum concentration of the agent be maintained in specified regions of the enclosure for a specified minimum hold time, said method comprising the steps of:

(a) transferring air either into or out of the enclosure and simultaneously measuring flow rate with quantitative accuracy, said air transfer being accompanied by an opposite, compensating flow through leakage sites present in the enclosure, (b) measuring a pressure difference between locations inside and outside said enclosure during said transfer of air, (c) determining a gravity head that would be developed from top to bottom of the enclosure relative to ambient air pressures outside at corresponding elevations, if a specified amount of a volatile, heavier-than-air fire extinguishing agent was injected and distributed uniformly as a vapor in the enclosure, (d) determining, by utilizing flow versus pressure data from said air transfer and pressure measuring means, a worst case upper limit of flow through leakage sites in the enclosure at a pressure in a general range including one-half said predicted gravity head, (e) determining a worst case lower limit on the hold time that would prevail during an actual test of a fire-extinguishing system in the enclosure by including effects of said estimated worst case upper limit leakage rate during said hold time, with concentration of the extinguishing agent assumed to remain above a specified concentration in a specified region inside the enclosure, (f) comparing said estimated worst case lower limit hold time with said minimum specification hold time to judge whether said fire extinguishing system installed in said enclosure would pass said minimum hold time specification, and if said worst case lower limit hold time is less than said minimum performance specification hold time, (g) conducting further action comprising locating sources of leakage in said enclosure and reducing at least some of the sources of leakage by filling at least a portion of the sources, and (h) repeating use of steps (a) through (f) to determine a new value of said worst case lower limit hold time of the enclosure, comparing said new value with said minimum performance specification hold time so as to judge whether the enclosure is then assured of meeting said performance specification, or if not, repeating steps (g) and (h).

23. A method according to claim 22, in which the pressure is measured by a micromanometer reading in increments of no more than 0.001 in. WC and having a rated accuracy within about ±1%.

24. A method according to claim 22, wherein the determination of a lower limit on predicted hold time includes an estimate of effects of diffusion and/or thermal convection currents to reduce a concentration gradient of the fire extinguishing agent at a boundary, if any, between a heavier lower gas layer derived from the initial air/agent mixture in the enclosure, and a lighter, upper layer derived from air entering the enclosure as air/agent mixture leaks therefrom.

25. A method according to claim 22 wherein if the worst case hold time is less than the minimum performance test hold time specification, including one or more further steps of applying sealing means to leakage sites in said enclosure to increase the worst case hold time to a value greater than said minimum test hold time.

26. A method according to claim 22 wherein the determination utilizing flow versus pressure data from measurements of said air transfer flow and of pressure comprises incorporation of data into a flow equation relating flow rate through leakage sites with pressure, using this flow equation to determine flow values at pressures in the general range of about one-half the gravity pressure head, determining the error pertaining to predicted flow values in said range, and determining from said flow equation and said error a determination of the worst case upper limit of leakage rate at a pressure in the general range of about one-half the aforesaid gravity pressure head.

27. A method according to claim 22 wherein flow rates determined with air being transferred into the enclosure at given pressure levels being appreciably different than when air is transferred out, said differences signifying an imbalance in air flows to and from the enclosure associated with air movement means and said imbalance being detrimental to the proper performance of a fire extinguishing system installed in said enclosure, the step of balancing HVAC flows to bring said differences in determined flows under pressurization and depressurization to within at least ±6%.

28. A method according to claim 22 wherein the step of transferring air is achieved by abruptly increasing pressure in said enclosure by a release of a quantity of a gas into the enclosure and the flow characteristics of the leakage sites in the enclosure are determined from a rate of decay with time of said pressure inside the enclosure.

29. A method according to claim 28 wherein the release of gas into the enclosure is by injection of a highly volatile liquid other than a fire-extinguishing agent through the system which is adapted to inject fire-extinguishing agent into the enclosure.

30. A method according to claim 22, wherein the determination of a lower limit on predicted hold time includes allowance for effects of location of a neutral pressure plane within the enclosure, said neutral plane being the horizontal level at which the pressure inside and outside the enclosure are essentially equal and its location being dependent on the distribution of leakage sites in walls, floor and ceiling of the enclosure.

31. A method according to claim 30, in which the worst-case location of the neutral plane is assumed to be about midway between the top and bottom of the enclosure.

32. A method according to claim 22 wherein said air is transferred by air transfer means mounted in a generally air-tight manner in at least one opening in walls of the enclosure and capable of generating a pressure difference between locations inside and outside the enclosure which is at least about twenty times greater than a limit of error of means used for measuring said pressure difference.

33. A method according to claim 32, wherein the air transfer means includes at least one test device known as a blower door, and such device is calibrated to measure air flow rate with an accuracy of at least $\pm 6\%$.

34. A method according to claim 22, in which the determination of the gravity head includes effects of the temperature of the air/agent mixture after injection of the fire extinguishing agent.

35. A method according to claim 34, in which the temperature of the air/agent mixture is assumed to be in the range of 10° to 30° F. below the initial air temperature.

36. A method according to claim 34, in which the temperature of the air/agent mixture is determined from a heat balance between a cooling effect due to vaporization of the fire extinguishing agent, and a warming effect due to heat transfer from the interior of the enclosure to the air/agent mixture.

37. A method for assuring that an enclosure is able to pass a minimum hold time requirement of a specified level and distribution of concentration when a volatile agent having a density different than air is injected and distributed in an initially generally uniform manner throughout the enclosure, said method comprising the steps of:

(a) transferring air either into or out of the enclosure and simultaneously measuring flow rate of the air, the air transfer being accompanied by an opposite, compensating flow through leakage sites present in the enclosure, (b) measuring a pressure difference between locations inside and outside said enclosure during said transfer of air, (c) determining a gravity head that would be developed from top to bottom of the enclosure relative to ambient air pressures outside at corresponding elevations, if a specified amount of the agent was injected and distributed uniformly as a vapor into the enclosure, (d) determining, by utilizing flow versus pressure data from said air flow and pressure measurements, a worst case upper limit of flow through leakage sites in the enclosure at a pressure in a general range including one-half said gravity head, (e) determining a worst case lower limit on the hold time that would prevail during an actual injection of the agent into the enclosure by including the effect of said worst case upper limit leakage rate, during said hold time, the concentration of the agent predicted to remain above a specified concentration in a specified region inside the enclosure, (f) comparing said estimated worst case lower limit hold time with said minimum specification hold time to judge whether said fire extinguishing system installed in said enclosure would pass said minimum hold time specification, and if said worst case lower limit hold time is less than said minimum performance specification hold time, (g) conducting further action steps comprising locating sources of leakage in said enclosure and reducing at least some of the sources of leakage by at lease partially filling the sources, and (h) repeating use of steps (a) through (f) to determine a new value of said worst case lower limit hold time of the enclosure, comparing said new value with said minimum performance specification hold time so as to judge whether the enclosure is then assured of meeting said performance specification, or if not, repeating steps (g) and (h).

* * * * *

UNITED STATES PATENT AND TRADEMARK OFFICE

CERTIFICATE OF CORRECTION

PATENT NO. : 5,128,881

DATED : July 7, 1992

INVENTOR(S) : SAUM et al

It is certified that error appears in the above-identified patent and that said Letters Patent is hereby corrected as shown below:

Column 4, line 24, between "%" and "one" insert --±--.

Column 5, line 31, "inforamtion" should read --information--.

Column 5, line 62, after "0.0063x" insert --h--.

Col. 7, line 8, after "about" delete --"-- and insert -- ±--.

Column 7, line 49, "is" should read --in.--.

Column 7, line 67, "if" should read --is--.

Column 8, line 48, "progressesm" should read --progresses--.

Column 10, line 36, "host" should read --hose--.

Column 10, line 42, "+" should read --±--.

Column 10, line 50, after "H" delete "+" and insert --=-- in place thereof;

Column 10, line 50, at right end of line insert --/ $T_{in}$)--.

Column 10, line 51, delete "$T_{in}$)".

Column 12, line 7, "pipin" should read --piping--.

Column 12, line 33, "p(s*)$_1$)" should read --P($s_1$)--.

CERTIFICATE OF CORRECTION

PATENT NO. : 5,128,881

DATED : July 7, 1992

INVENTOR(S) : SAUM et al

It is certified that error appears in the above-identified patent and that said Letters Patent is hereby corrected as shown below:

Column 12, line 52, "C" should read --F--.

Column 13, line 57, "$K_3X$---$K_n$" should read --$k_3x$---$k_n$--.

Column 13, line 61, delete in both occurrences "γ" and "δ" and insert --∂--.

Column 13, line 62, "$X_2^{2+}$ ----)0.5" should read --$X_2)^{2+}$ ----)0.5--.

Column 14, line 2, "$E_14$" should read --$E_1$=..

Column 14, line 8, delete "ti".

Column 14, line 11, "conidtions" should read --conditions--.

Column 14, line 50, "including" should read --inducing--.

Column 15, line 9, "H" should read --h--.

Column 15, line 29, "outisde" should read --outside--.

Column 16, line 1, "faisl" should read --fails--.

Column 16, line 41, "area" should read --are--.

Column 17, line 7 "spciication" should read --specification; and "110" should read --10.

UNITED STATES PATENT AND TRADEMARK OFFICE

CERTIFICATE OF CORRECTION

PATENT NO. : 5,128,881

DATED : July 7, 1992

INVENTOR(S) : SAUM et al

It is certified that error appears in the above-identified patent and that said Letters Patent is hereby corrected as shown below:

Column 17, line 36, "metho" should read--method--.

Column 22, line 39, "14" and "15" should read --14*-- and --15*--.

Column 23, line 13, "on" should read --one--.

Signed and Sealed this

Twenty-first Day of December, 1993

Attest:

BRUCE LEHMAN

Attesting Officer

Commissioner of Patents and Trademarks